United States Patent

Jeon et al.

(10) Patent No.: US 8,599,929 B2
(45) Date of Patent: Dec. 3, 2013

(54) DISTRIBUTED VIDEO DECODER AND DISTRIBUTED VIDEO DECODING METHOD

(75) Inventors: Byeung-Woo Jeon, Seongnam-si (KR); Tae-Won Do, Suwon-si (KR); Hiuk-Jae Shim, Chuncheon-si (KR)

(73) Assignee: Sungkyunkwan University Foundation for Corporate Collaboration, Gyeonggi-Do (KR)

( * ) Notice: Subject to any disclaimer, the term of this patent is extended or adjusted under 35 U.S.C. 154(b) by 1047 days.

(21) Appl. No.: 12/588,388

(22) Filed: Oct. 14, 2009

(65) Prior Publication Data

US 2010/0177893 A1 Jul. 15, 2010

(30) Foreign Application Priority Data

Jan. 9, 2009 (KR) .................. 10-2009-0002093
Jun. 5, 2009 (KR) .................. 10-2009-0049707

(51) Int. Cl.
*H04N 7/12* (2006.01)
*H04N 11/02* (2006.01)
*H04N 11/04* (2006.01)

(52) U.S. Cl.
USPC .................................................. 375/240.25

(58) Field of Classification Search
USPC ............... 375/240.01, 240.012, E07.279, 375/E07.246, E07.211; 714/752, E11.032; 380/239
IPC ..................................................... H04N 7/167
See application file for complete search history.

(56) References Cited

U.S. PATENT DOCUMENTS

2005/0031219 A1* 2/2005 Puri et al. ............... 382/250
2009/0147841 A1* 6/2009 Chang et al. ............ 375/240.01
2010/0166057 A1* 7/2010 Huchet et al. .......... 375/240.01
2010/0241924 A1* 9/2010 Nishi ........................ 714/758
2010/0322312 A1* 12/2010 Boisson et al. .......... 375/240.13

OTHER PUBLICATIONS

Aaron, A.; "Wyner-Ziv Video Coding with Hash-based Motion Compensation at the Receiver," Oct. 2004, Int'l Conference on Image Processing, pp. 3097-3100.*
Pereira, F.; "Wyner-Ziv Coding: A Review of the Early Architectures and Further Developments," Apr. 2008, 2008 IEEE Int'l Conference on Multimedia and Expo, pp. 625-628.*
Dufaux, F.; "Distributed Video Coding: Trends and Perspectives," Jan. 2009, EURASIP Journal on Image and Video Processing, Article No. 10, pp. 1-13.*
Li, Z.; "Distributed Video Coding Based on Conditional Entropy Hash," Sep. 2010, International Conference on Computational Aspects of Social Networks, pp. 382-385.*

* cited by examiner

*Primary Examiner* — Y Lee
*Assistant Examiner* — Neil Mikeska
(74) *Attorney, Agent, or Firm* — Harness, Dickey & Pierce, P.L.C.

(57) ABSTRACT

A distributed video decoder and a distributed video decoding method are provided. The distributed video decoder includes a key picture decoding unit which reconstructs a key picture received from an encoder, a hash information selecting unit which determines necessary hash information using the reconstructed key picture and/or generated previous side information, and a side information generating unit which generates side information using the reconstructed key picture and/or hash information selected based on information determined by the hash information selecting unit. The distributed video decoder further includes a channel code decoding unit which estimates a quantized value by using a parity bit received from the encoder and the generated side information, and a video reconstructing unit which reconstructs a current picture as a decoding target by using the quantized value estimated by the channel code decoding unit and the generated side information.

16 Claims, 23 Drawing Sheets

KEY PICTURE    SIDE INFORMATION    KEY PICTURE

<MOTION VECTOR AT THE TIME OF SIDE INFORMATION GENERATION>

◄---- = ◄──── × ½

◄──── : mv_KEY (MOTION VECTOR BETWEEN PICTURES)

◄---- : mv_SI (MOTION VECTOR OF SIDE INFORMATION TO BE GENERATED)

◄-·-- : mv_RE (MOTION VECTOR BETWEEN GENERATED SIDE INFORMATION AND KEY PICTURE)

FIG. 7

| A(x , y) or B(x , y) | A(x , y+1) or B(x , y+1) | A(x , y+2) or B(x , y+2) | A(x , y+3) or B(x , y+3) |
|---|---|---|---|
| A(x+1 , y) or B(x+1 , y) | A(x+1 , y+1) or B(x+1 , y+1) | A(x+1 , y+2) or B(x+1 , y+2) | A(x+1 , y+3) or B(x+1 , y+3) |
| A(x+2 , y) or B(x+2 , y) | A(x+2 , y+1) or B(x+2 , y+1) | A(x+2 , y+2) or B(x+2 , y+2) | A(x+2 , y+3) or B(x+2 , y+3) |
| A(x+3 , y) or B(x+3 , y) | A(x+3 , y+1) or B(x+3 , y+1) | A(x+3 , y+2) or B(x+3 , y+2) | A(x+3 , y+3) or B(x+3 , y+3) |

FIG. 10

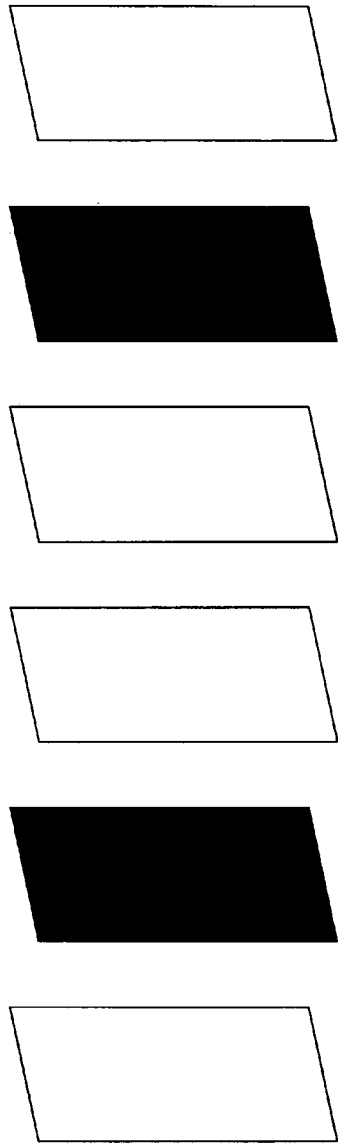

SELECT WZ PICTURE NEEDING HASH INFORMATION AT THE TIME OF SIDE INFORMATION GENERATION FROM AMONG WZ PICTURES (a)

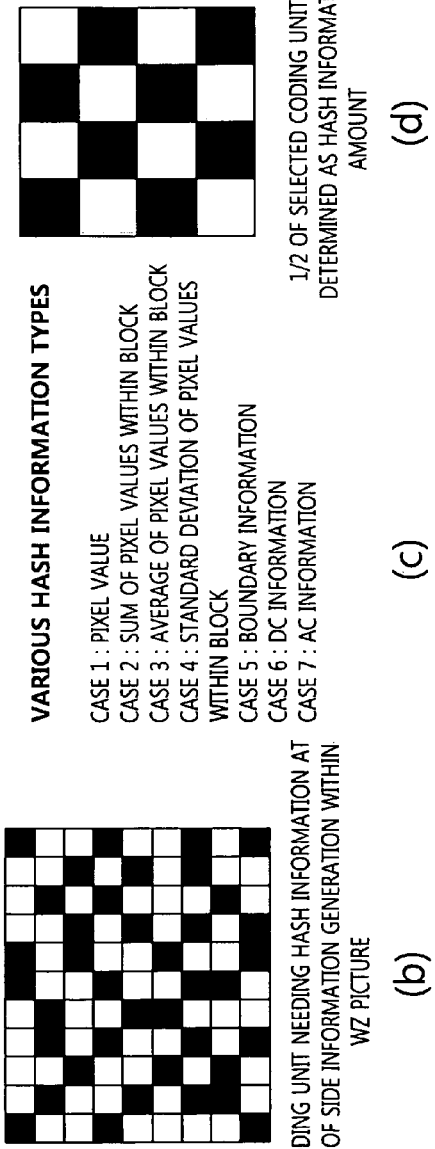

VARIOUS HASH INFORMATION TYPES

CASE 1 : PIXEL VALUE
CASE 2 : SUM OF PIXEL VALUES WITHIN BLOCK
CASE 3 : AVERAGE OF PIXEL VALUES WITHIN BLOCK
CASE 4 : STANDARD DEVIATION OF PIXEL VALUES WITHIN BLOCK
CASE 5 : BOUNDARY INFORMATION
CASE 6 : DC INFORMATION
CASE 7 : AC INFORMATION (c)

1/2 OF SELECTED CODING UNIT IS DETERMINED AS HASH INFORMATION AMOUNT (d)

SELECT CODING UNIT NEEDING HASH INFORMATION AT THE TIME OF SIDE INFORMATION GENERATION WITHIN WZ PICTURE (b)

DISTRIBUTED VIDEO DECODER AND DISTRIBUTED VIDEO DECODING METHOD

CLAIM FOR PRIORITY

This application claims priority to Korean Patent Application No. 10-2009-0002093 filed on Jan. 9, 2009, and Korean Patent Application No. 10-2009-0049707 filed on Jun. 5, 2009 in the Korean Intellectual Property Office (KIPO), the entire contents of which are hereby incorporated by reference.

BACKGROUND

1. Technical Field

Example embodiments of the present invention relates in general to a distributed video decoder and a distributed video decoding method.

2. Description of the Related Art

Video compression standards such as MPEG-4 video coding and MPEG-4 AVC/H.264 are usually employed in video players, video on demands (VODs), video telephones, digital multimedia broadcasting (DMB), and wireless mobile environments for video data compression and transmission. The compression techniques remove temporal redundancy to achieve high coding efficiency. A motion estimation and compensation technique is commonly used as a representative method of reducing temporal redundancy. However, the motion estimation and compensation technique has a disadvantage in that power consumption is high since computation cost of a moving picture encoder is relatively high. Therefore, in order to achieve low power consumption, it is very important to reduce complexity of the encoder in a limited source environment such as a sensor network.

As a method of resolving the complexity problem of the encoder, a distributed video coding (DVC) technique which is based on a Wyner-Ziv theorem has been highlighted. The distributed video coding technique separately encodes video pictures and does not perform motion compensation between video pictures, which is performed in existing techniques, in order to detect similarity between video pictures, whereby computation cost is reduced.

A conventional distributed video coding technique based on the Wyner-Ziv theorem will be described below with reference to FIG. 1. FIG. 1 is a block diagram illustrating a configuration of an encoder 110 and a decoder 130 according to a conventional Wyner-Ziv coding technique.

The encoder 110 classifies pictures of a source video content into two types. One is a picture (hereinafter, referred to as a "WZ picture") which is to be encoded by the distributed video coding technique, and the other is a picture (hereinafter, referred to as a "key picture") which is to be encoded by a conventional coding technique other than the distributed video coding technique.

The key pictures are encoded in a key picture encoding unit 114 by, for example, an intra picture coding technique of H.264/MPEG-4 AVC and transmitted to the decoder 130. A key picture decoder 133 of the decoder 130 reconstructs the received key pictures. A side information generating unit 134 generates side information corresponding to the WZ picture using the key pictures reconstructed by the key picture decoding unit 133 and transmits the side information to a channel code decoding unit 131.

The side information generating unit 134 assumes a linear motion between pictures located before and after the WZ picture and generates the side information corresponding to the WZ picture by using an interpolation technique.

In order to encode the WZ picture, a quantization unit 111 of the encoder 110 performs quantization of the WZ picture and outputs quantized values of the WZ picture to a block unit dividing unit 112. The block unit dividing unit 112 divides the quantized values of the WZ picture into predetermined coding units. A channel code encoding unit 113 generates a parity bit of each coding unit by using a channel code.

The parity bits are temporarily stored in a parity buffer (not illustrated) and then sequentially transmitted to the decoder 130 when the decoder 130 requests the parity via a feedback channel.

The channel code decoding unit 131 of the decoder 130 receives the parity from the encoder 110 to estimate the quantized values. A video reconstruction unit 132 receives the quantized values estimated by the channel code decoding unit 131 and dequantizes the quantized values to reconstruct the WZ picture.

The distributed video coding technique based on the Wyner-Ziv theorem corrects a noise included in the side information generated by the decoder by using the parity and thereby reconstructs the current WZ picture. As the noise included in the side information is decreased, a required parity amount is decreased. Therefore, in order to have a good rate-distortion performance, it is important to generate the side information without a noise. The side information is typically generated such that a motion vector between reconstructed key pictures is estimated, a motion vector of side information which is desired to be reconstructed is obtained from the motion vector between the reconstructed key pictures in consideration of a distance between the pictures, and a coding unit within a key picture indicated by the obtained motion vector of the side information is generated as the side information.

FIG. 2 illustrates a conventional method of generating the side information. A motion vector MV2 of side information to be reconstructed is obtained from a motion vector MV1 between reconstructed key pictures. It can be understood that the motion vector MV2 of the side information is half (½) of the motion vector MV1 between the key pictures. Of course, there may be several side information between pictures, and a motion vector between key pictures may be obtained from both directions.

However, in the case in which the motion vector of the side information which is desired to be generated is obtained from the motion vector between the reconstructed key pictures, when a motion between pictures is complicated, when a motion does not linearly change, or when an object or a background suddenly disappears or appears, wrong side information may be generated. In this case, since the generated side information has a lot of noises, it is difficult to sufficiently remove the noises by the received parity.

For the foregoing reasons, information (hash information) of the WZ picture is necessary. The hash information is useful in generating the side information without any noise, but the hash information itself has a large amount of bits, and thus there is a problem in that a transmission bit rate is increased. Therefore, there is a need for improving the quality of the side information from which the noise is difficult to be removed while reducing an amount of bits increased by the hash information.

SUMMARY

Accordingly, example embodiments of the present invention are provided to substantially obviate one or more problems due to limitations and disadvantages of the related art.

Example embodiments of the present invention provide a distributed video decoder and a distributed video decoding method in which the hash information used to generate the side information is effectively selected, so that the noise included in the side information is reduced, a compression rate is increased, and a performance of the decoder is improved.

In some example embodiments, a distributed video encoder includes: a key picture decoding unit which reconstructs a key picture received from an encoder; a hash information selecting unit which determines necessary hash information using the reconstructed key picture and/or generated previous side information; and a side information generating unit which generates side information using the reconstructed key picture and/or hash information selected based on information determined by the hash information selecting unit.

The distributed video decoder may further include: a channel code decoding unit which estimates a quantized value by using a parity bit received from the encoder and the generated side information; and a video reconstructing unit which reconstructs a current picture as a decoding target by using the quantized value estimated by the channel code decoding unit and the generated side information.

In other example embodiments, a distributed video decoder includes: a frame buffer which stores reconstructed key pictures reconstructed from key pictures received from an encoder; and a decoding unit which selectively requests the encoder to transmit hash information with respect to side information which is determined as a noise is difficult to be removed by using a parity received from the encoder.

The decoding unit may selectively request the encoder to transmit hash information with respect to side information which is determined as a noise is difficult to be removed by using a parity received from the encoder, generate side information using the reconstructed key picture and/or hash information selected by the encoder, and reconstruct a current picture as a decoding target by using a parity bit received from the encoder and the side information.

In still other example embodiments, a distributed video encoder includes: a key picture decoding unit which reconstructs a key picture received from an encoder; a side information generating unit which generates side information using the reconstructed key picture; a channel code decoding unit which estimates a quantized value by using a parity bit received from the encoder and the generated side information; an intra coding selecting unit which estimates an amount of a noise included in the generated side information and selects side information or a coding unit within side information which is estimated having a lot of noise; and a video reconstructing unit which reconstructs a current picture as a decoding target by using the quantized value estimated by the channel code decoding unit and the side information.

In still other example embodiments, a distributed video encoder includes: a key picture decoding unit which reconstructs a key picture received from an encoder; a side information generating unit which generates side information using the reconstructed key picture; a parity request skip selecting unit which determines an image quality of the generated side information; a channel code decoding unit which skips a parity bit request to the encoder and estimates a quantized value by using the side information when it is determined the image quality of the generated side information is better than a predetermined criterion; and a video reconstructing unit which reconstructs a current picture as a decoding target by using the quantized value estimated by the channel code decoding unit and the side information.

In still other example embodiments, a distributed video decoding method includes: reconstructing a key picture received from an encoder; determining necessary hash information using the reconstructed key picture and/or generated previous side information; and generating side information using the reconstructed key picture and/or the determined hash information.

BRIEF DESCRIPTION OF THE DRAWINGS

Example embodiments of the present invention will become more apparent by describing in detail example embodiments of the present invention with reference to the accompanying drawings, in which:

FIG. 7 is a view illustrating a process of computing temporal motion estimation reliability in units of macroblocks when a size of a macroblock is 8×8;

FIGS. 10A to 10D illustrate a case in which a position of a portion which needs hash information is selected in units of pictures and in units of macroblocks, an appropriate hash information type is selected, and ½ of a selected coding unit which needs hash information is transmitted as a hash information amount;

DETAILED DESCRIPTION OF EXAMPLE EMBODIMENTS

Figure 1:
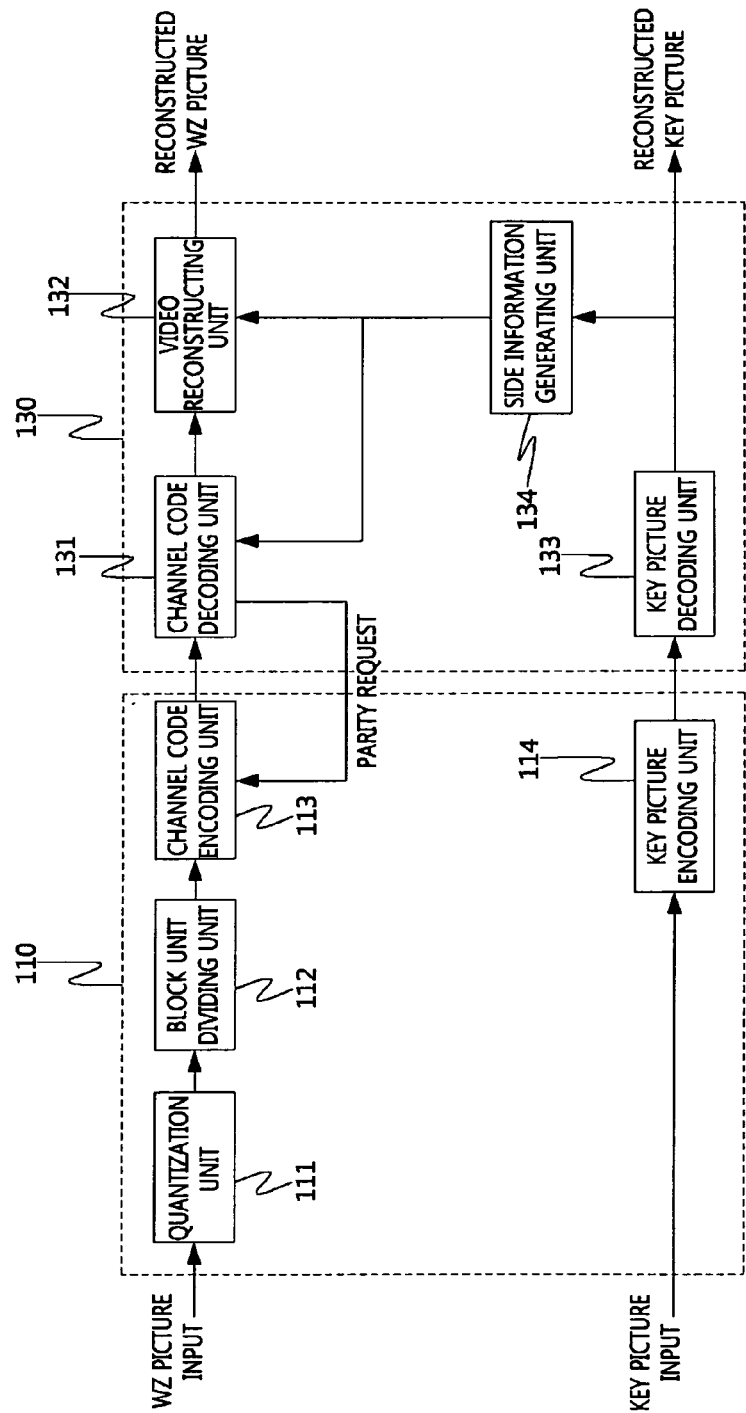
FIG. 1 is a view illustrating a configuration of an encoder and a decoder according to a conventional Wyner-Ziv coding technique.
Figure 2:
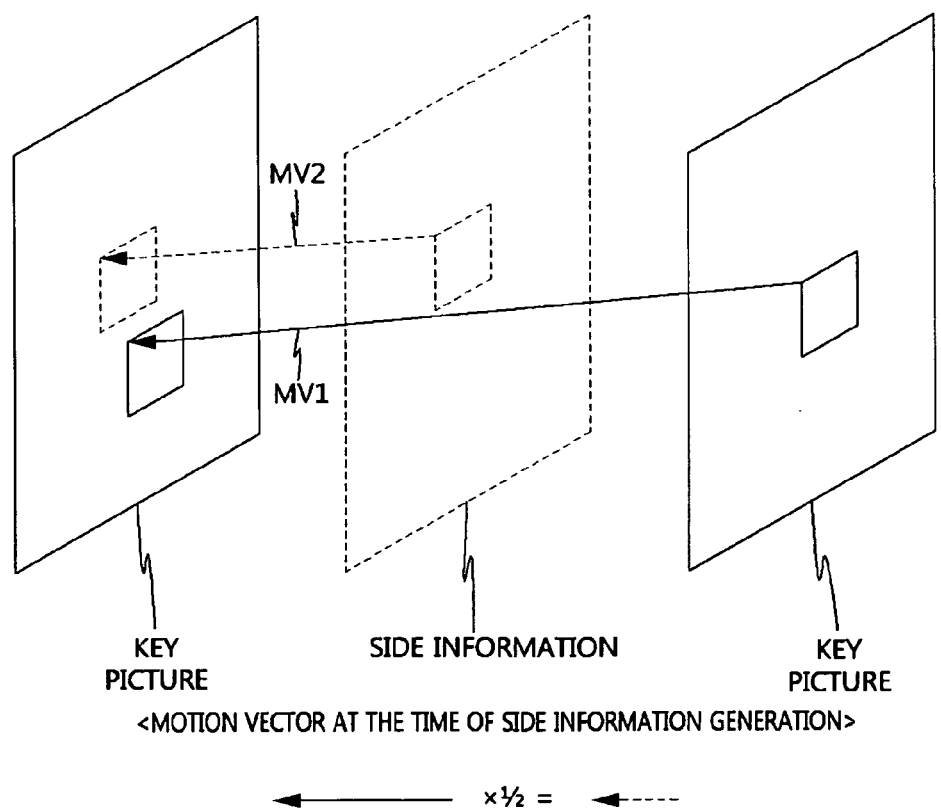
FIG. 2 illustrates a conventional method of generating side information.

Example embodiments of the present invention are disclosed herein. However, specific structural and functional details disclosed herein are merely representative for purposes of describing example embodiments of the present invention, however, example embodiments of the present invention may be embodied in many alternate forms and should not be construed as limited to example embodiments of the present invention set forth herein.

Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention. Like numbers refer to like elements throughout the description of the figures.

Figure 3:
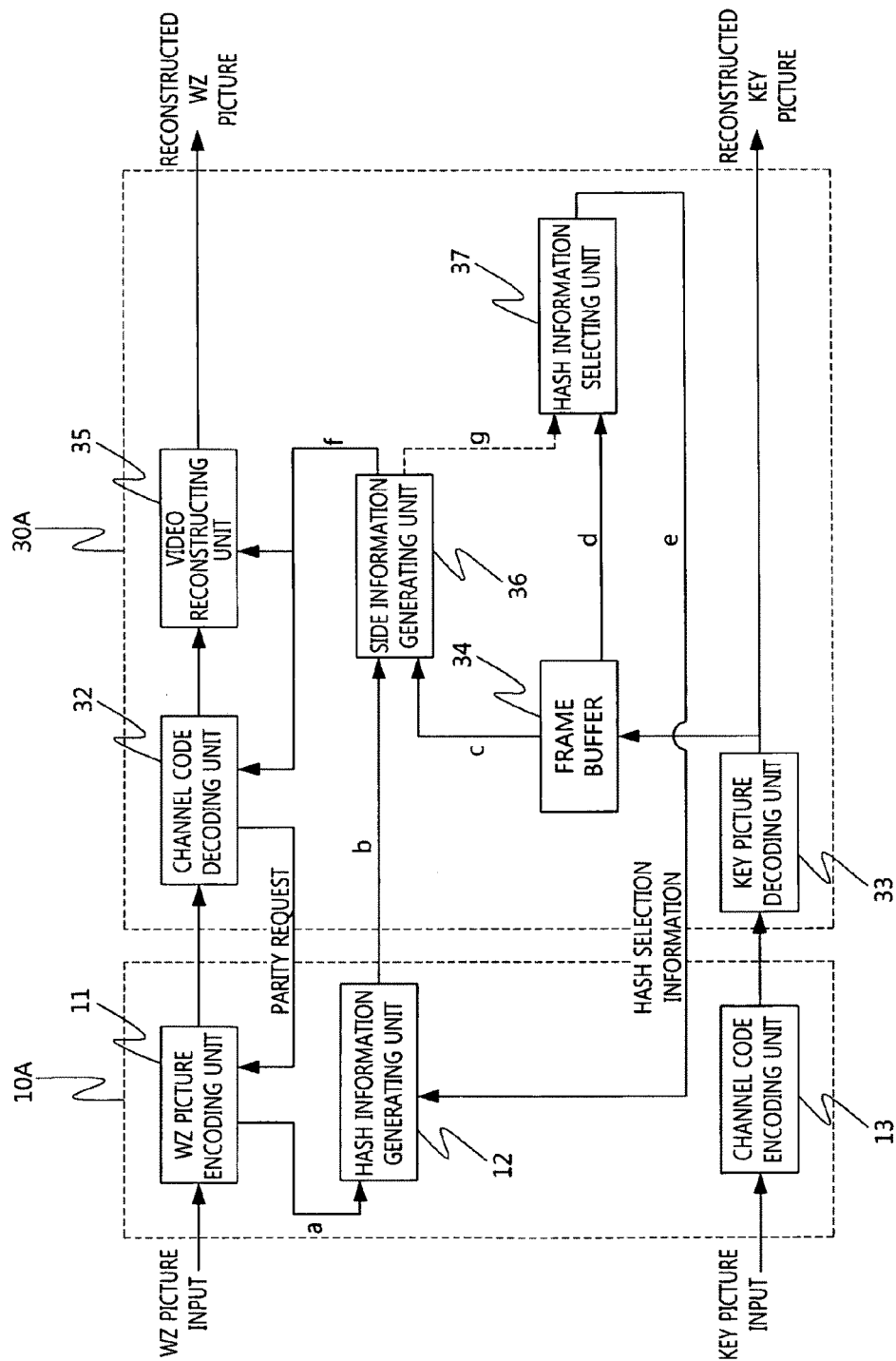
FIG. 3 is a block diagram illustrating a Wyner-Ziv encoding and decoding system according to a first example embodiment of the present invention.

FIG. 3 is a block diagram illustrating a Wyner-Ziv encoding and decoding system according to a first example embodiment of the present invention.

The Wyner-Ziv encoding and decoding system of FIG. 3 includes a Wyner-Ziv encoder 10A and a distributed video decoder 30A which has a function of generating side information by selectively using hash information.

The Wyner-Ziv encoder 10A classifies pictures of a source video content into WZ pictures and key pictures according to a Wyner-Ziv coding technique. For example, even-numbered pictures of the source video content may be classified as the key pictures, and odd-numbered pictures may be classified as the WZ pictures.

The Wyner-Ziv encoder 10A encodes the WZ pictures and the key pictures and transmits the encoded WZ pictures and the encoded key pictures to the decoder 30A.

Referring to FIG. 3, the Wyner-Ziv encoder 10A includes a WZ picture encoding unit 11, a hash information generating unit 12, and a key picture encoding unit 13.

The key picture encoding unit 13 encodes the key pictures and outputs the encoded key pictures to the decoder 30A. The WZ picture encoding unit 11 performs quantization of the WZ pictures, generates parity bits used for reconstructing the WZ pictures from the quantized values of the WZ pictures and outputs the parity bits to the decoder 30A. The WZ picture encoding unit 11 may include a quantizer and a low density parity check (LDPC) encoder. The quantizer and the LDPC encoder are well-known to the person skilled in the art, and thus description thereof is omitted.

The decoder 30A includes a frame buffer 34 and a decoding unit. The decoding unit includes a channel code decoding unit 32, a key picture decoding unit 33, a video reconstructing unit 35, a side information generating unit 36, and a hash information selecting unit 37.

The decoding unit selectively requests the encoder 10A to transmit hash information with respect to side information which is determined as a noise is difficult to be removed even using the parity received from the encoder 10A. Further, the decoding unit generates side information by using the reconstructed key picture and/or hash information selected by the encoder 10A. Further, the decoding unit reconstructs a current picture as a decoding target by using the parity bit received from the encoder 10A and the side information.

The key picture decoding unit 33 reconstructs the key picture by using information received from the key picture encoding unit 13. The hash information selecting unit 37 generates hash selection information for selecting a portion which needs hash information at the time of side information generation. The hash information generating unit 12 generates necessary hash information according to the hash selection information received from the hash information selecting unit 37. The side information generating unit 36 generates side information of the current WZ picture to be reconstructed by using the reconstructed key picture and/or the generated hash information.

The channel code decoding unit 32 estimates the quantized values by using the side information received from the side information generating unit 35 and the parity bit received from the Wyner-Ziv encoder 10A. The video reconstructing unit 35 reconstructs the current WZ picture by using the quantized values estimated by the channel code decoding unit 32 and the side information.

The channel code decoding unit 32 of FIG. 3 may be configured to continuously request the encoder 10A to provide the parity bit within a predetermined limit and receive the parity bit from the encoder 10 until reliable estimation is possible when it is determined that it cannot estimate reliable quantized values while performing channel code decoding.

In this case, the channel code decoding unit 32 receives a parity amount necessary for decoding from the Wyner-Ziv encoder 10A, and thus it is efficient from a point of view of a rate-distortion performance. This is possible when a reverse channel (that is, a feedback channel) through which the parity bit is requested is present.

In order to mitigate the problem, the channel code decoding unit 32 may be configured to receive the parity bit at a time without requesting a predetermined parity amount at each time via the reverse channel.

Even in this case, the channel code decoding unit 32 may be configured to additionally request the parity bit when it is determined that reliability is still low after all of the received parity bits are exhausted. Further, when the reverse channel is not used, the Wyner-Ziv encoder 10A may be configured to transmit a certain parity amount which is previously set to the decoder 30A, and the decoder 30A may be configured not to request the parity bit.

Further, a turbo code or an LDPC channel code which is proven as nearly reaching the Shannon limit is preferably used as a channel code used in the channel code decoding unit 32. It can be understood that other channel codes which are excellent in coding efficiency and error correction may be used.

Figure 4:
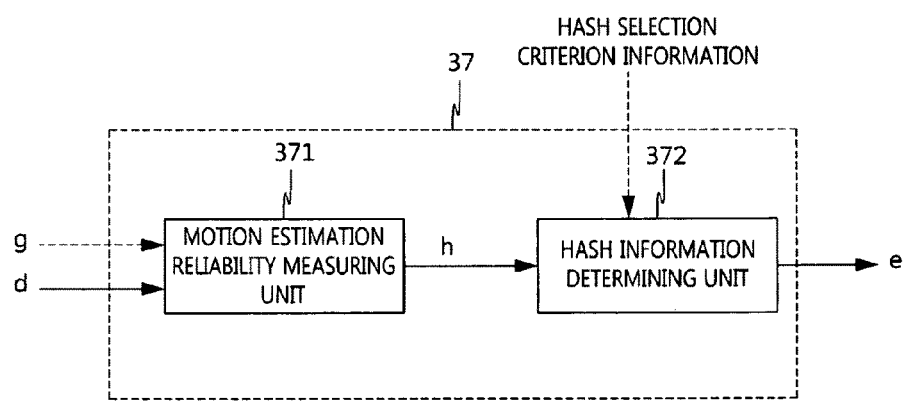
FIG. 4 is a block diagram illustrating a configuration of a hash information selecting unit according to the first example embodiment of the present invention.

FIG. 4 is a block diagram illustrating a configuration of the hash information selecting unit 37 according to the first example embodiment of the present invention. When a motion between pictures is complicated, when a motion does not linearly change, or when an object or a background suddenly disappears or appears, since a motion vector used at the time of side information generation may not be accurately estimated, there is a high possibility that side information having a lot of noises is to be generated. In this case, accurate motion estimation can be performed by using hash information received from the encoder 10A. However, if a large amount of bits are additionally allocated to hash information, it is disadvantageous from a point of view of a bit rate. Therefore, in generating the side information, hash information is preferably used only with respect to a portion which needs the hash information. To this end, the hash information selecting unit 37 selects a portion which needs the hash information at the time of side information generation, whereby an amount of added bits can be reduced, and the side information with the reduced noise can be generated.

As illustrated in FIG. 4, the hash information selecting unit 37 according to the present invention includes a motion estimation reliability measuring unit 371 and a hash information determining unit 372.

Figure 5:
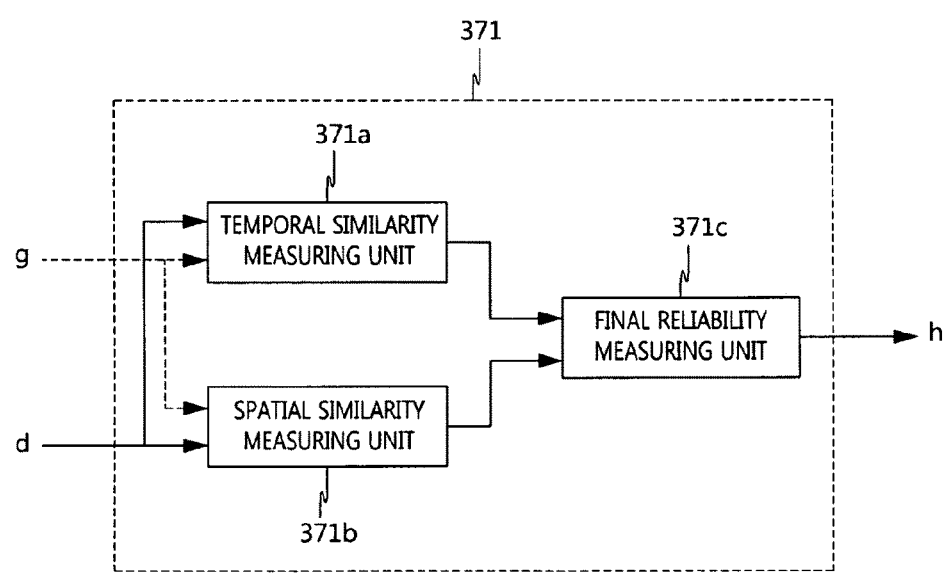
FIG. 5 is a block diagram illustrating a configuration of a motion estimation reliability measuring unit according to the first example embodiment of the present invention.

The motion estimation reliability measuring unit 371 includes a temporal similarity measuring unit 371a, a spatial similarity measuring unit 371b, and a final reliability measuring unit 371c as illustrated in FIG. 5. The temporal similarity measuring unit 371a measures temporal similarity between key pictures d reconstructed by the key picture decoding unit 33 and side information g generated by the side information generating unit 36, and the spatial similarity measuring unit 371b measures spatial similarity between key pictures d reconstructed by the key picture decoding unit 33 and/or between the side information g generated by the side information generating unit 36.

Figure 6:
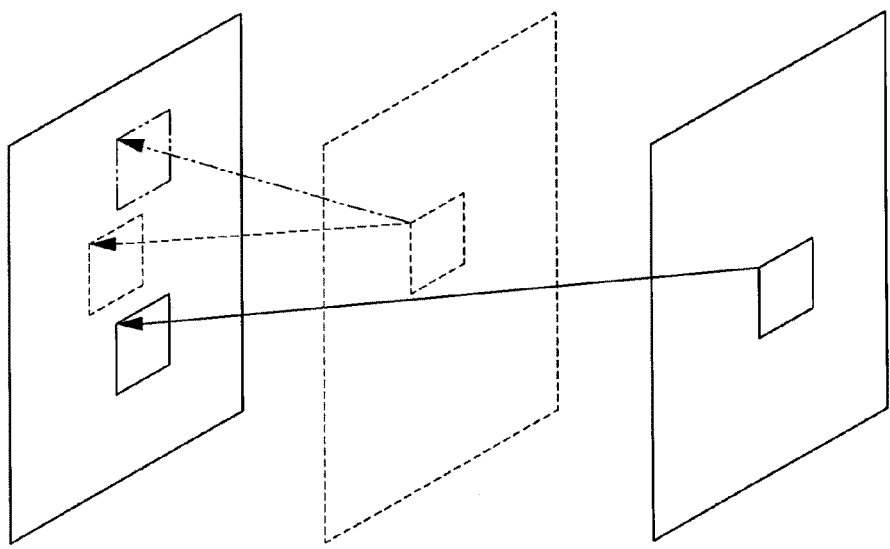
FIG. 6 is a view illustrating a process of measuring temporal similarity through a motion estimation reliability measuring unit according to the first example embodiment of the present invention.

A process of measuring the temporal similarity through the motion estimation reliability measuring unit 371 is illustrated in FIG. 6. Similarity between pictures may be computed based on a motion vector difference between the reconstructed key picture d and the generated side information g as in Equation 1.

$$\text{If } N\left\{\text{mv\_RE} = \frac{\text{mv\_KEY}}{2}\right\} < \sigma 1, \text{ transmit hash,} \quad \text{Equation 1}$$

where N(x) denotes the number of generated x, mv_KEY denotes a motion vector between pictures, mv_SI (a motion vector of side information to be generated) denotes a motion vector which is computed by ½ of the motion vector mv_KEY between pictures, and mv_RE is a motion vector between the generated side information and the key picture after the side information is generated by an interpolation technique. In Equation 1, the number of times in which a case in which the motion vector corresponding to ½ of mv_KEY is identical to a motion vector of mv_RE occurs is measured. σ1 is a threshold value used as a criterion for determining temporal reliability. When N(x) is smaller than the threshold value σ1, transmission of hash information is selected. In Equation 1, temporal motion estimation reliability is computed in units of pictures in order to select side information which needs hash information, while in Equation 2, temporal motion estimation reliability is computed in units of macroblocks in order to select information which needs hash information.

$$\text{If } \left|(\text{mv\_RE}) - \left(\frac{\text{mv\_KEY}}{2}\right)\right| > \sigma 2, \text{ transmit hash.} \quad \text{Equation 2}$$

In Equation 2, an absolute value of a difference between mv_KEY as a motion vector between the reconstructed key pictures and mv_RE as a motion vector between the reconstructed key picture and the generated side information is measured. σ2 is a threshold value used as a criterion for determining temporal reliability. When the absolute value of the difference between the two motion vectors is larger than the threshold value σ2, transmission of hash information is selected.

In Equation 1 and 2, temporal motion estimation reliability is computed by using the motion vectors in order to select side information which needs hash information. On the other hand, temporal motion estimation reliability may be computed in units of macroblocks without using the motion vectors in order to select side information which needs hash information as in Equation 3. An example of this method is illustrated FIG. 7.

$$SAD(x, y) = \sum_{i=0}^{3} \sum_{j=0}^{3} |A(x+i, y+j) - B(x+i, y+j)| \quad \text{Equation 3}$$

$$SAD(x, y) > \sigma_3, \text{ tansmit hash.}$$

In Equation 3, if A is a pixel value and/or a frequency domain value of the generated side information, B may be regarded as a pixel value and/or a frequency domain value of a reconstructed previous key picture and/or a reconstructed subsequent key picture. When the generated side information is not considered, A may be regarded as a pixel value and/or a frequency domain value of a reconstructed previous key picture, and B may be regarded as a pixel value and/or a frequency domain value of a reconstructed subsequent key picture. In Equation 3 and FIG. 7, a size of a macroblock is 4×4, but Equation 3 may be applied to a macroblock of a different size.

The spatial similarity measuring unit 371b of the motion estimation reliability measuring unit 371 may compute similarity between the reconstructed pixel and neighboring pixels within the reconstructed current key picture and/or the generated side information based on a difference between a pixel value of a corresponding pixel and pixel values of neighboring pixels within the reconstructed current key picture and/or the generated side information as in Equation 4. An example of this method is illustrated in FIG. 8.

$$NHD[\hat{X}(i, j)] = \quad \text{Equation 4}$$
$$\{\hat{X}(i-1, j), \hat{X}(i+1, j), \hat{X}(i, j-1), \hat{X}(i, j+1)\}$$
$$\Delta_{max} = \hat{X}(i, j) - \max NHD[\hat{X}(i, j)],$$
$$\Delta_{min} = \min NHD[\hat{X}(i, j)] - \hat{X}(i, j)$$
$$\Delta_{spatial} = \frac{\Delta_{max} + |\Delta_{max}| + \Delta_{min} + |\Delta_{min}|}{2}$$
$$C_{spatial} = \frac{1}{\Delta_{spatial}}$$
$$C_{spatial} \geq \sigma 4 \rightarrow \text{Confidence}[\hat{X}(i, j)] = 1 \rightarrow \text{no hash}$$
$$C_{spatial} < \sigma 4 \rightarrow \text{Confidence}[\hat{X}(i, j)] = 0 \rightarrow \text{transmit hash.}$$

Figure 8:
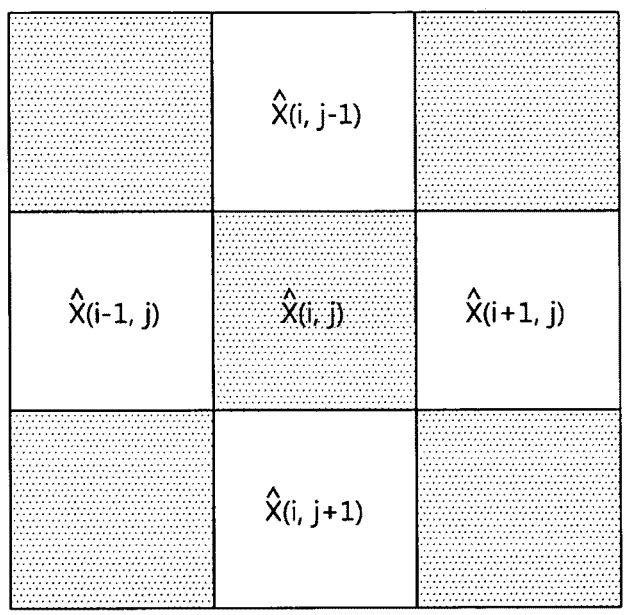
FIG. 8 is a view illustrating a process of computing similarity between a reconstructed pixel and neighboring pixels within a reconstructed current key picture and/or generated side information based on a pixel value difference between a corresponding pixel and neighboring pixels within a reconstructed current key picture and/or generated side information.

In Equation 4, $\hat{X}(i,j)$ denotes a pixel value of the corresponding pixel within the reconstructed current key picture and/or the generated side information at a position of (i,j), and NHD[$\hat{X}(i,j)$] denotes a set of pixel values of spatially neighboring pixels within the reconstructed current key picture and/or the generated side information as illustrated in FIG. 8. $C_{spatial}$ denotes spatial similarity, and σ4 denotes a threshold value used as a criterion for determining reliability.

For example, when a pixel value $\hat{X}(i,j)$ of the corresponding pixel is 152 and N[$\hat{X}(i,j)$] which is a set of pixel values of spatially neighboring pixels of the corresponding pixel is {70, 68, 91, 78}, maxNHD[X̂(i,j)] is 91, and minNHD[X̂(i,j)] is 68. Therefore, according to Equation 4, $\Delta_{max}$ is 61, and $\Delta_{min}$ is −84. Therefore, since $$\Delta_{spatial} \text{ is } \frac{61+61-84+84}{2},$$

$\Delta_{max}$ is 61, and $C_{spatial}$ is 0.02. Since σ4 is 0.11 as a reciprocal of a standard deviation of neighboring pixels, the computation result states that a corresponding position needs hash information since reliability of the corresponding pixel is low.

In addition to the above-described embodiment, various approaches to the equations described above can be made to measure the temporal similarity and the spatial similarity.

The final reliability measuring unit 371c of the motion estimation reliability measuring unit 371 measures reliability of final motion estimation based on the similarity measured by the temporal similarity measuring unit 371a, or the similarity measured by the spatial similarity measuring unit 371b, or both the temporal similarity and the spatial similarity.

Figure 9:
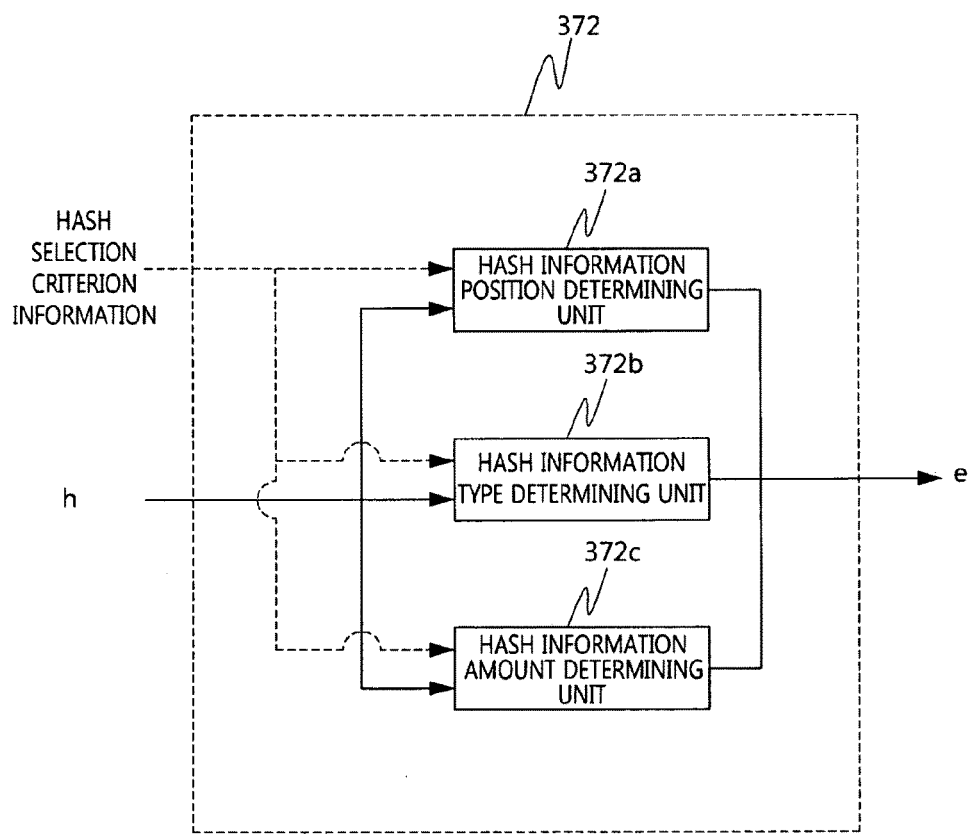
FIG. 9 is a block diagram of a hash information determining unit of the hash information selecting unit according to the first example embodiment of the present invention.

The hash information determining unit 372 of the hash information selecting unit 37 determines a portion which needs hash information at the time of side information generation. The hash information determining unit 372 includes a hash information position determining unit 372a, a hash information type determining unit 372b, and a hash information amount determining unit 372c as illustrated in FIG. 9. The hash information position determining unit 372a determines a position in which hash information is needed based on reliability h of motion estimation measured by the motion estimation reliability measuring unit 371 and hash selection criterion information representing a predetermined threshold value. The hash information type determining unit 372b selects a hash information type which can be used at the selected hash information position. The hash information amount determining unit 372c determines a hash information amount suitable for the selected position and the determined hash information type.

The hash information position determining unit 372a may select a position of a portion which needs hash information in units of pictures as illustrated in FIG. 10A or in a predetermined unit, for example, in units of macroblocks or blocks with a predetermined size as illustrated in FIG. 10B.

The hash information type determining unit 372b selects hash information of an appropriate type. FIG. 10C illustrates various selectable hash information types.

The hash information amount determining unit 372c selects hash information of an appropriate amount. FIG. 10D illustrates a case in which hash information is transmitted at a predetermined ratio (for example, 1/2) within a picture unit, a macroblock unit, or a block unit of a predetermined size.

Figure 11:
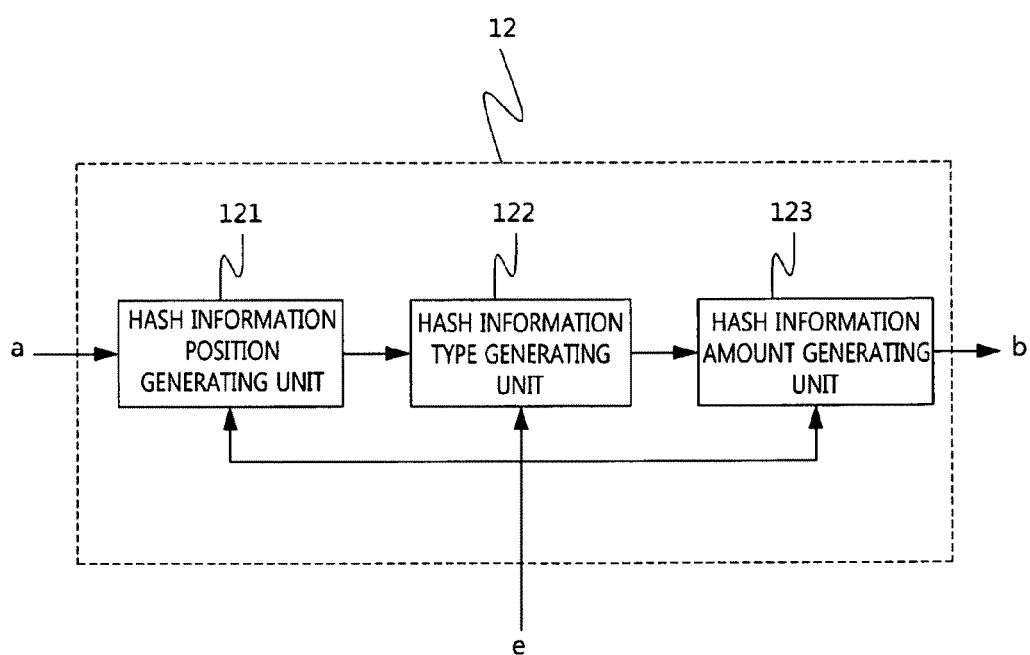
FIG. 11 is a block diagram illustrating a configuration of a hash information generating unit according to the first example embodiment of the present invention.

FIG. 11 is a block diagram illustrating a configuration of the hash information generating unit 12 according to the first example embodiment of the present invention. The hash information generating unit 12 generates hash information b based on information (a) of the WZ picture received from the WZ picture encoding unit 11 according to hash selection information e determined by the hash information selecting unit 37. The information a received from the WZ picture encoding unit 11 is information of the WZ picture, and information of various values may be used depending on in which of a pixel area and/or a transform area the WZ picture encoding unit 11 performs encoding. The hash information is information of the WZ picture and is not limited to information of an original WZ picture (an uncompressed WZ picture). Besides the original WZ picture information, the hash information may be WZ picture information after predetermined processing such as discrete cosine transform (DCT) transform and/or quantization of the original WZ picture is performed or a predetermined portion of the WZ picture after the predetermined processing is performed. Further, the hash information may be other information such as edge information and color information within the WZ picture.

As illustrated in FIG. 11, the hash information generating unit 12 includes a hash information position generating unit 121, a hash information type generating unit 122, and a hash information amount generating unit 123.

The hash information position generating unit 121 selects a position which needs hash information at the time of side information generation according to the hash information e determined by the hash information selecting unit 37. A position of hash information to be generated may be selected in units of WZ pictures (FIG. 10A) or in coding units (FIG. 10B) such as macroblocks or blocks of a predetermined size from among the WZ pictures.

The hash information type generating unit 122 selects a type of hash information to be generated with respect to the position of the hash information to be generated selected by the has information position generating unit 121 according to the hash selection information e determined by the hash information selecting unit 37. As the type of the hash information to be generated, various types such as a pixel value, a sum of pixel values within a block, an average of pixel values within a block, a standard deviation of pixel values within a block, boundary information, DC information, and AC information can be selected as illustrated in FIG. 10C.

The hash information amount generating unit 123 selects a necessary amount of hash information with respect to a WZ picture unit and/or a coding unit which is the position in which hash information selected by the hash information position generating unit 121 is to be generated and the type in which the hash information selected by the hash information type generating unit 122 is to be generated, according to the hash selection information e determined by the hash information selecting unit 37. FIG. 10D illustrates a case in which ½ of the selected coding unit which needs hash information to be generated is transmitted as the hash information amount. An overall selected coding unit may be transmitted as the hash information amount, and an amount smaller than an overall selected coding unit may be selected as the hash information amount. An amount of bits allocated to the selected hash information type may be adjusted to generate hash information of a different amount.

Figure 12:
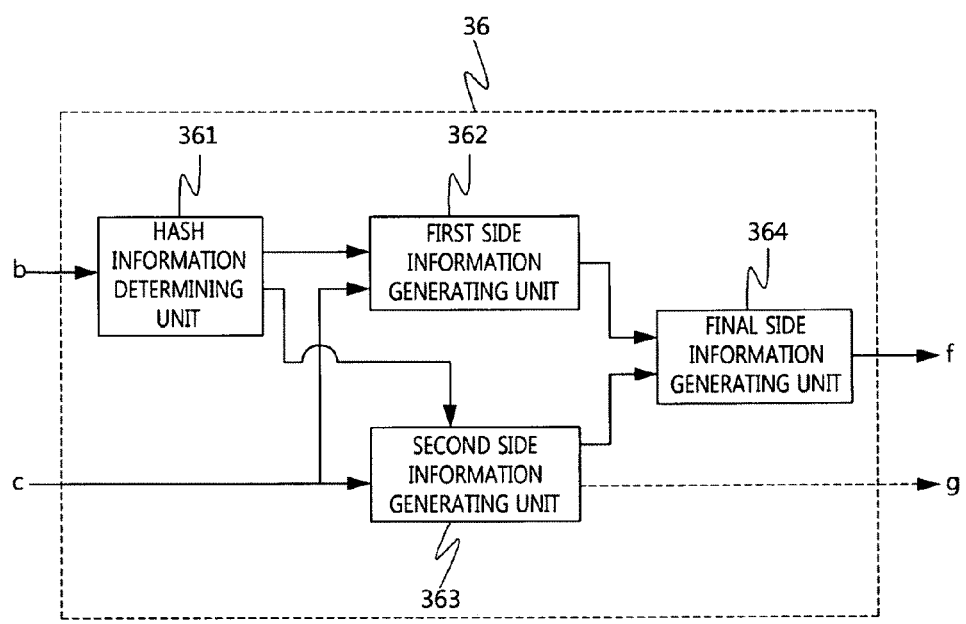
FIG. 12 is a block diagram illustrating a configuration of a side information generating unit according to the first example embodiment of the present invention.
Figure 13:
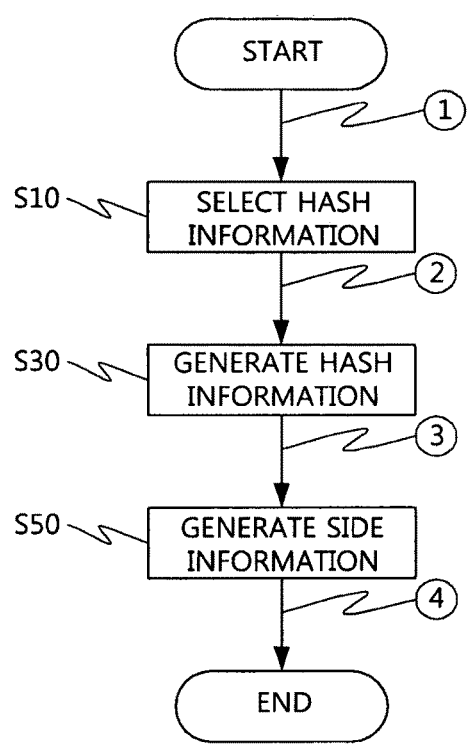
FIGS. 13 to 18 are flowcharts illustrating a distributed video decoding process selectively using hash information according to the first example embodiment of the present invention.

FIG. 12 is a block diagram illustrating a configuration of the side information generating unit 36 according to the first example embodiment of the present invention. The side information generating unit 36 generates side information which is regarded as a noise of a virtual channel is added to a current picture to be reconstructed by using similarity between neighboring pictures. The side information may be generated by an interpolation technique which uses motion estimation from the reconstructed key picture or by using hash information received from the encoder when motion estimation between the reconstructed pictures is not accurate.

As illustrated in FIG. 12, the side information generating unit 36 includes a hash information determining unit 361, a first side information generating unit 362, a second side information generating unit 363, and a final side information generating unit 364.

The hash information determining unit 361 determines whether or not hash information b generated by the hash information generating unit 12 has been received. When it is determined that the hash information has been received, the hash information determining unit 361 transmits the hash information to the first side information generating unit 363 so that the hash information can be used at the time of side information generation. When the hash information b has not been received, the hash information determining unit 361 enables the second side information generating unit 363 to generate the side information without using the hash information. At this time, the side information is generated by the conventional side information generating method. For example, the side information may be generated by using information of a reconstructed key picture, information of a current picture which is being constructed, or information of a constructed previous picture.

The first side information generating unit 362 generates the side information using the hash information received from the hash information determining unit 361 and the reconstructed key picture c. Since accurate motion estimation can be performed using the received hash information, the side information in which the noise is more effectively removed is generated compared to a case in which hash information is not used.

The second side information generating unit 363 generates the side information by using the reconstructed key pictures c positioned before and after the WZ picture without using hash information. The side information corresponding to a WZ picture to be reconstructed is generated by using an interpolation assuming a linear motion. According to a case, an extrapolation technique may be used.

A distributed video decoder and a distributed video decoding method using selectively hash information according to the first example embodiment of the present invention will be described below in detail with reference to FIGS. 13 to 18.

Figure 14:
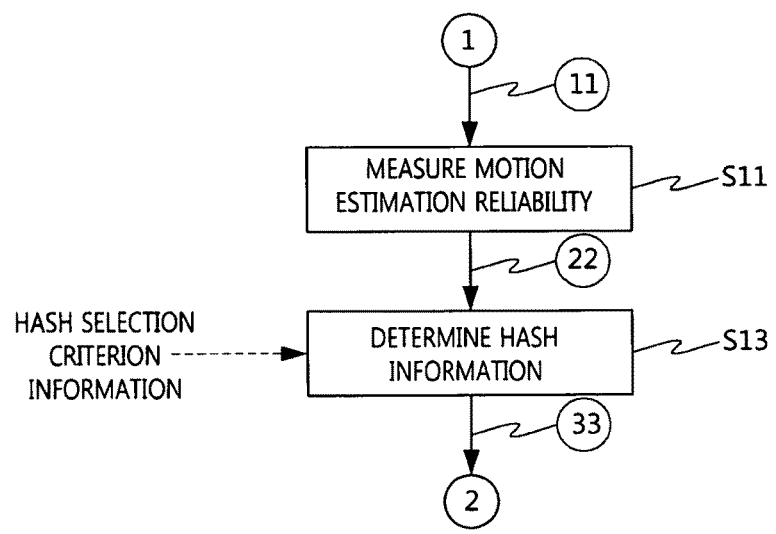
Figure 15:
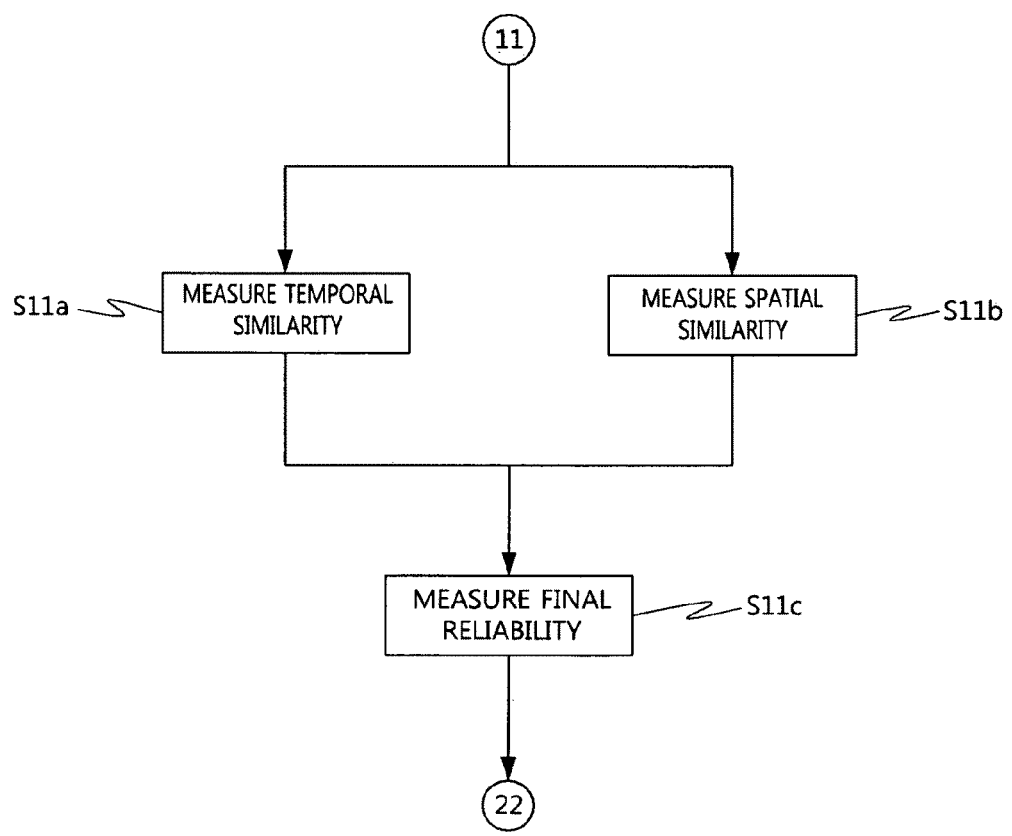
Figure 16:
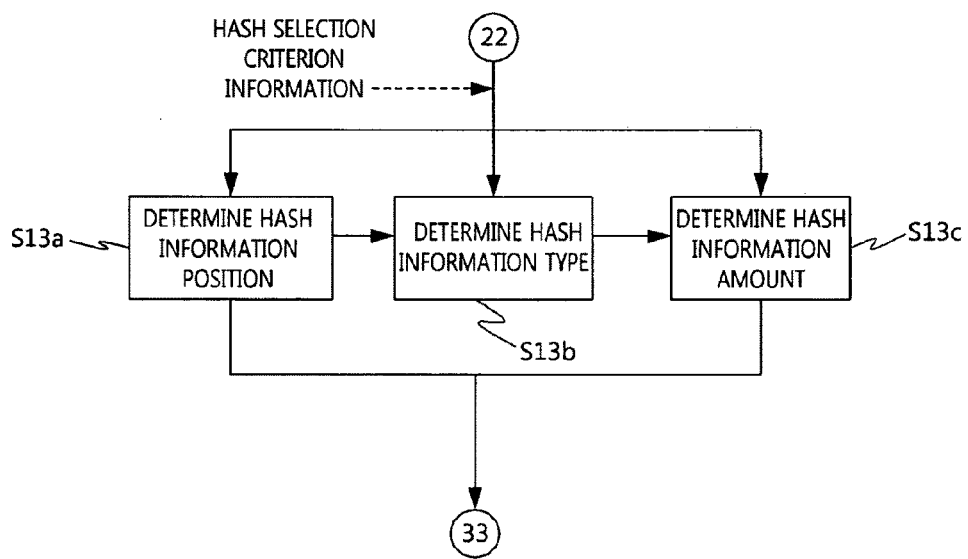

A process (step S10) of selecting hash information may be implemented by various methods. An example of the process (step S10) is illustrated in FIGS. 14 to 16. Referring to FIG. 14, in step S11, motion estimation reliability used at the time of side information generation is measured, and in step S13, a hash information position, a hash information type, and a hash information amount which are used at the time of side information generation are selected based on the motion estimation reliability and predetermined hash selection criterion information.

The process (step S11) of measuring motion estimation reliability will be described below in detail with reference to FIG. 15. In step S11a, temporal similarity between the reconstructed current key picture d and the generated side information g may be computed as in Equation 1 and/or Equation 2. Temporal similarity between the reconstructed current key pictures d may be computed without using the generated side information g as in Equation 3.

In step S11b, spatial similarity between each position of the reconstructed current key picture d and/or the generated side information g and neighboring pixels is measured. The spatial similarity may be computed based on a difference between each pixel value of the reconstructed current key picture d and/or the generated side information g and pixel values of neighboring pixels as in Equation 4.

The above-described computation methods of measuring the similarities are examples, and other computation methods may be used.

In step S11c, the temporal similarity value measured in step S11a and the spatial similarity value measured in step S11b are compared with predetermined threshold values, respectively. When the temporal similarity value and the spatial similarity are smaller than predetermined threshold values, a corresponding picture is determined as having low motion estimation reliability, and thus it may be determined that hash information is selectively necessary.

In FIG. 15, in the process (step S11) of measuring motion estimation reliability illustrated in FIG. 14, both the temporal similarity and the spatial similarity are used in the process (step S11c) of measuring final reliability. However, either the temporal similarity or the spatial similarity may be used in the process (step S11c) of measuring final reliability.

The process (step S13) of determining hash information will be described below in detail with reference to FIG. 16. For a picture which is determined as having low motion estimation reliability through the process (S11) of measuring the motion estimation reliability, hash information is selectively determined based on predetermined hash selection criterion information. In step S13a, as illustrated in FIGS. 10A and 10B, a position of a picture which needs hash information at the time of side information generation or a position of a macroblock or a block of a predetermined size which needs hash information at the time of side information generation is determined. In step S13b, as illustrated in FIG. 10C, a hash information type useful for motion estimation at the time of side information generation is determined. The hash information type may include a pixel value, a sum of pixel values within a block, an average of pixel values within a block, a standard deviation of pixel values within a block, boundary information, DC information, AC information, or an appropriate combination thereof.

In step S13c, hash information of an appropriate amount is determined in consideration of an amount of added bits. As illustrated in FIG. 10D, ½ in a check board shape may be selected as the hash information amount with respect to the hash information position determined in step S13a and the hash information type determined in step S13b. Only a part may be selected according to a zigzag order as the hash information amount, and hash information of an appropriate amount may be selected by other methods.

Figure 17:
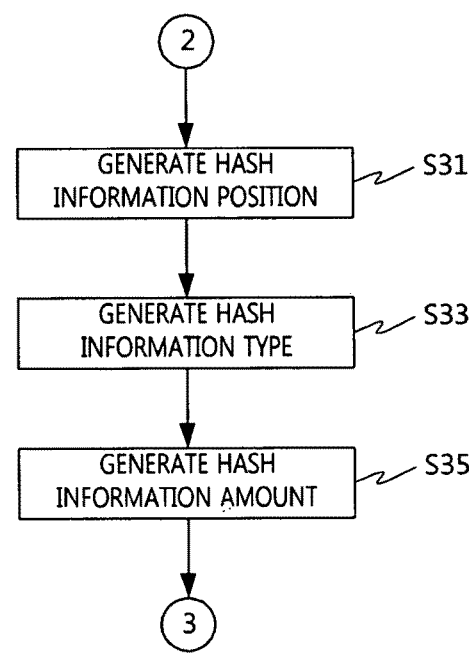

Returning back to FIG. 13, in the process (step S30) of generating the hash information, the hash information used for accurately estimating a motion vector at the time of side information generation through the side information generating unit 36 is generated based on the information a of the current picture provided from the WZ picture encoding unit 11 and the hash selection information e selected by the hash information selecting unit 37. The process (step S30) of generating the hash information may be implemented by various methods, and an example thereof is illustrated in FIG. 17.

In step S31, hash information is generated according to information selected in step S13a while passing the information a of the current WZ picture which corresponds to a position of a picture which needs hash information at the time of side information generation or a position of a macroblock or a block of a predetermined size within a WZ picture as illustrated in FIGS. 10A and 10B.

In step S33, hash information is generated according to the hash selection information e selected in step S13b while passing the information a of the current WZ picture corresponding to the hash information type usefully used for motion vector estimation at the time of side information generation with respect to a picture, a macroblock within a picture, or a block of a predetermined size selected in step S13a. The hash information type may be any one of Cases 1 to 8 as illustrated in FIG. 10C. Further, the hash information type may be hash information of other types.

In step S35, hash information is generated according to information selected in step S13c while passing the information a of the current WZ picture of an appropriate amount with respect to a picture, a macroblock within a picture, or a block of a predetermined size selected in step S13a and the hash information type selected in step S13b. In step S13c, hash information of an appropriate amount is determined in consideration of an amount of added bits. FIG. 10D illustrates a case in which ½ in a check board shape is selected as the hash information amount. Only a part may be selected according to a zigzag order as the hash information amount, and an appropriate hash information amount may be selected by other methods.

Steps S31, S33, and S35 may be performed in parallel according to a user's configuration. Further, when steps S31, S33, and S35 are sequentially performed, they do not need to be performed according to a sequence illustrated in FIG. 17, and a sequence in which steps S31, S33, and S35 are performed may be changed.

In step S50, the side information is generated by using the hash information b generated by the hash information generating unit 12 and the reconstructed past and/or future key pictures c which are stored in the frame buffer 34. When the hash information b has not been received from the hash information generating unit 12, the side information is generated by using the reconstructed past and/or future key pictures c. The process (step S50) of generating the side information may be implemented by various methods, and an example thereof is illustrated in FIG. 18.

Figure 18:
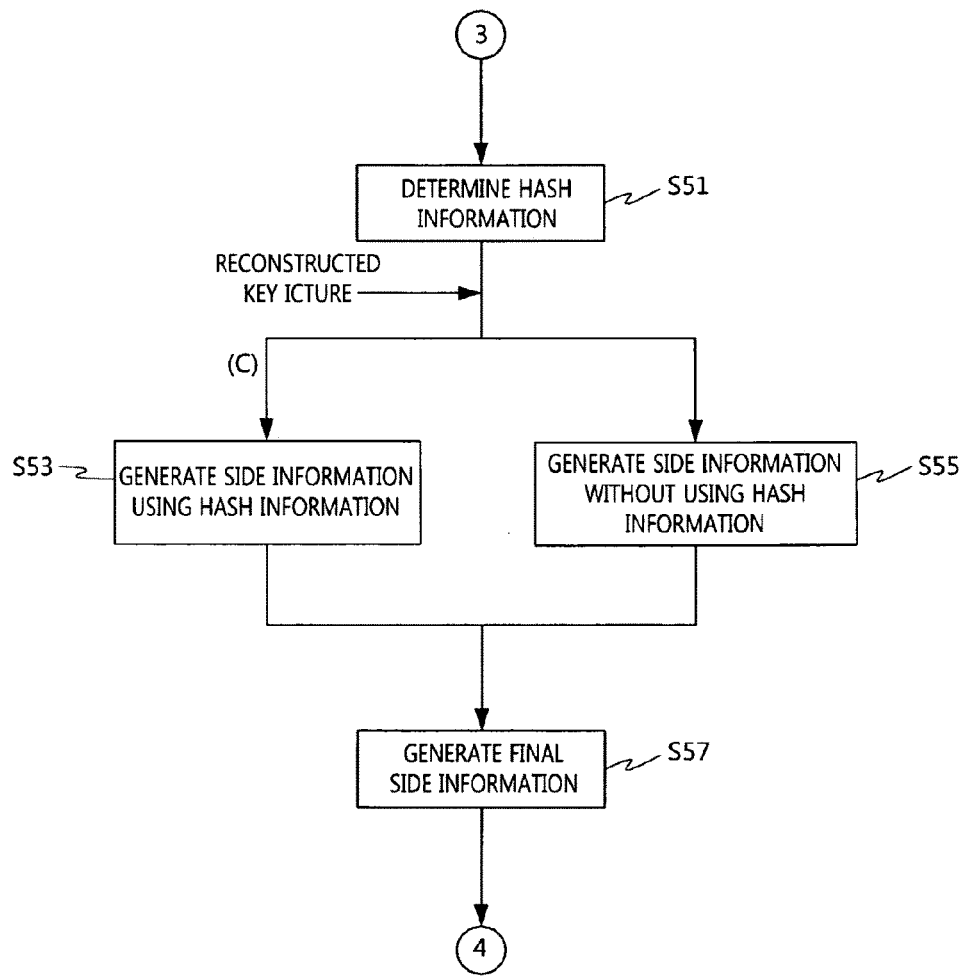

Referring to FIG. 18, in step S51, it is determined whether or not the hash information b has been received before side information generation.

In step S53, when it is determined in step S51 that the hash information has been received, the side information is generated by using the received hash information and the reconstructed key picture c.

In step S55, when it is determined in step S51 that the hash information has not been received, the side information is generated by using the reconstructed key picture c without using the hash information.

Figure 19:
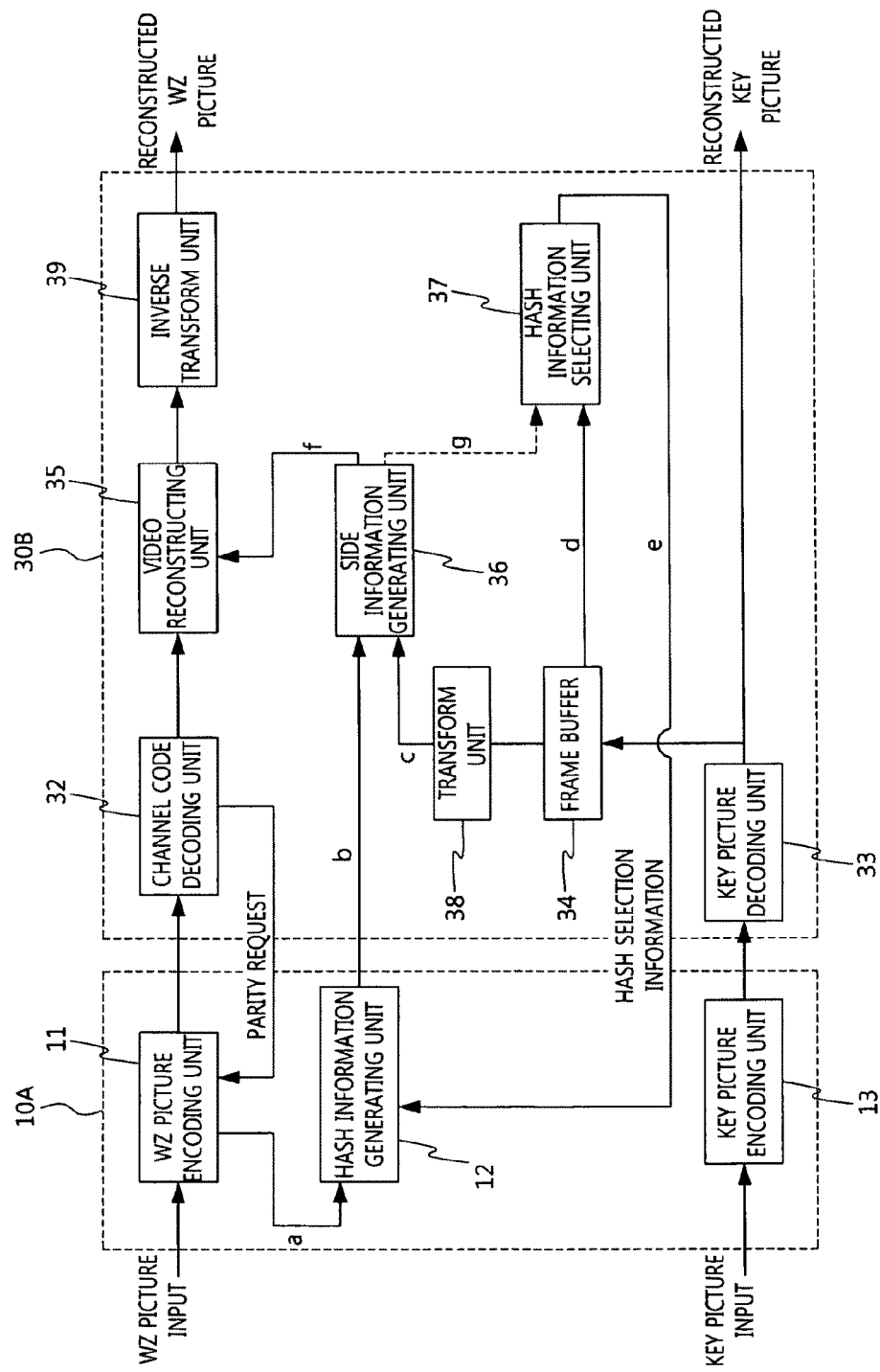
FIG. 19 illustrates a Wyner-Ziv encoding and decoding system according to a second example embodiment of the present invention.

In step S57, the side information, which was generated in step S55 without using the hash information, is output, or the side information, which was generated in step S53 with using the hash information b when the hash information b is transmitted, is output. The generated side information g may be transmitted to the hash information selecting unit 37 and used for selecting hash information necessary for re-generating side information in which the noise is efficiently removed. The side information f generated in step S57 is transmitted to the channel code decoding unit 32. The channel code decoding unit 32 receives the parity bit generated by a channel code from the encoder and removes the noise and thereafter estimates the quantized values by using the side information f. Further, the side information f finally generated in step S57 is transmitted to the video reconstructing unit 35 and used for dequantizing the estimated quantized values to thereby reconstruct the WZ picture. In the above-described embodiment, encoding and decoding processes such as quantization are performed within a pixel area, but an area in which encoding and decoding are performed and hash information is selected may be a transform area instead of a pixel area. When the present invention is applied to the transform area, as illustrated in FIG. 19, a decoder 30B may further include a transform unit 38 and an inverse transform unit 39 in addition to the configuration of the decoder 30A of FIG. 3. FIG. 19 illustrates a Wyner-Ziv encoding and decoding system according to a second example embodiment of the present invention. An internal configuration of the encoder 10A is the same as in the encoder 10A of FIG. 3, and thus description thereof is omitted.

A pixel or a corresponding position described in the embodiments of the present invention may be expressed by a transform coefficient of the transform area such as DCT or wavelet transform as well as the pixel area. When it is expressed by the transform coefficient of the transform area, as illustrated in FIG. 19C, the transform unit 38 and the inverse transform unit 39 are further installed in the decoder 30B. In this case, a pixel used in description of the present invention may be expressed by a transform coefficient.

Figure 20:
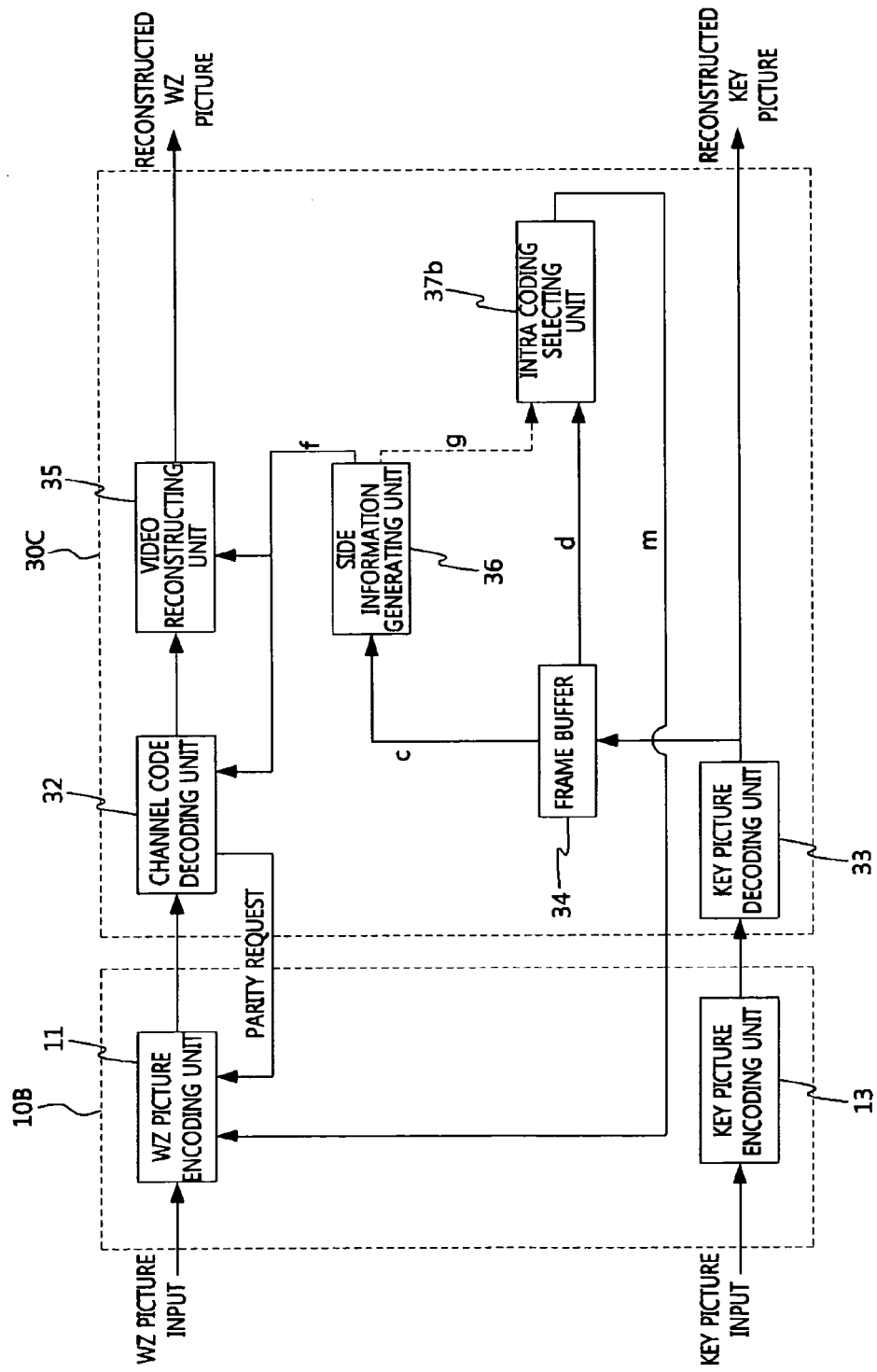
FIG. 20 is a block diagram illustrating a Wyner-Ziv encoding and decoding system according to a third example embodiment of the present invention.

FIG. 20 is a block diagram illustrating a Wyner-Ziv encoding and decoding system according to a third example embodiment of the present invention.

The Wyner-Ziv encoding and decoding system according to the third example embodiment of the present invention includes a Wyner-Ziv encoder 10B and a distributed video decoder 30C which has a function of estimating an amount of the noise included in side information to be generated and selectively performing intra coding.

Referring to FIG. 20, the Wyner-Ziv encoder 10B includes a key picture encoding unit 13 and a WZ picture encoding unit 11. The decoder 30C includes a key picture decoding unit 33, a channel code decoding unit 32, a video reconstructing unit 35, a side information generating unit 36, and an intra coding selecting unit 37b.

The key picture decoding unit 33 reconstructs the key picture using information received from the key picture encoding unit 13. The intra coding selecting unit 37b estimates an amount of the noise included in side information to be generated and selects (m) intra coding with respect to side information (for example, a WZ picture unit) or a coding unit (for example, a WZ macroblock unit or a block unit of a predetermined size) within side information which is estimated as having a lot of noises. With respect to side information or a coding unit within side information which is selected as an intra coding target, the distributed video coding technique is not applied, but a coding technique (m) such as intra picture coding, inter picture coding or skipping techniques described in H.264 is applied. With respect to side information or a coding unit within side information which is not selected as an intra coding target, the distributed video coding technique is applied.

Figure 21:
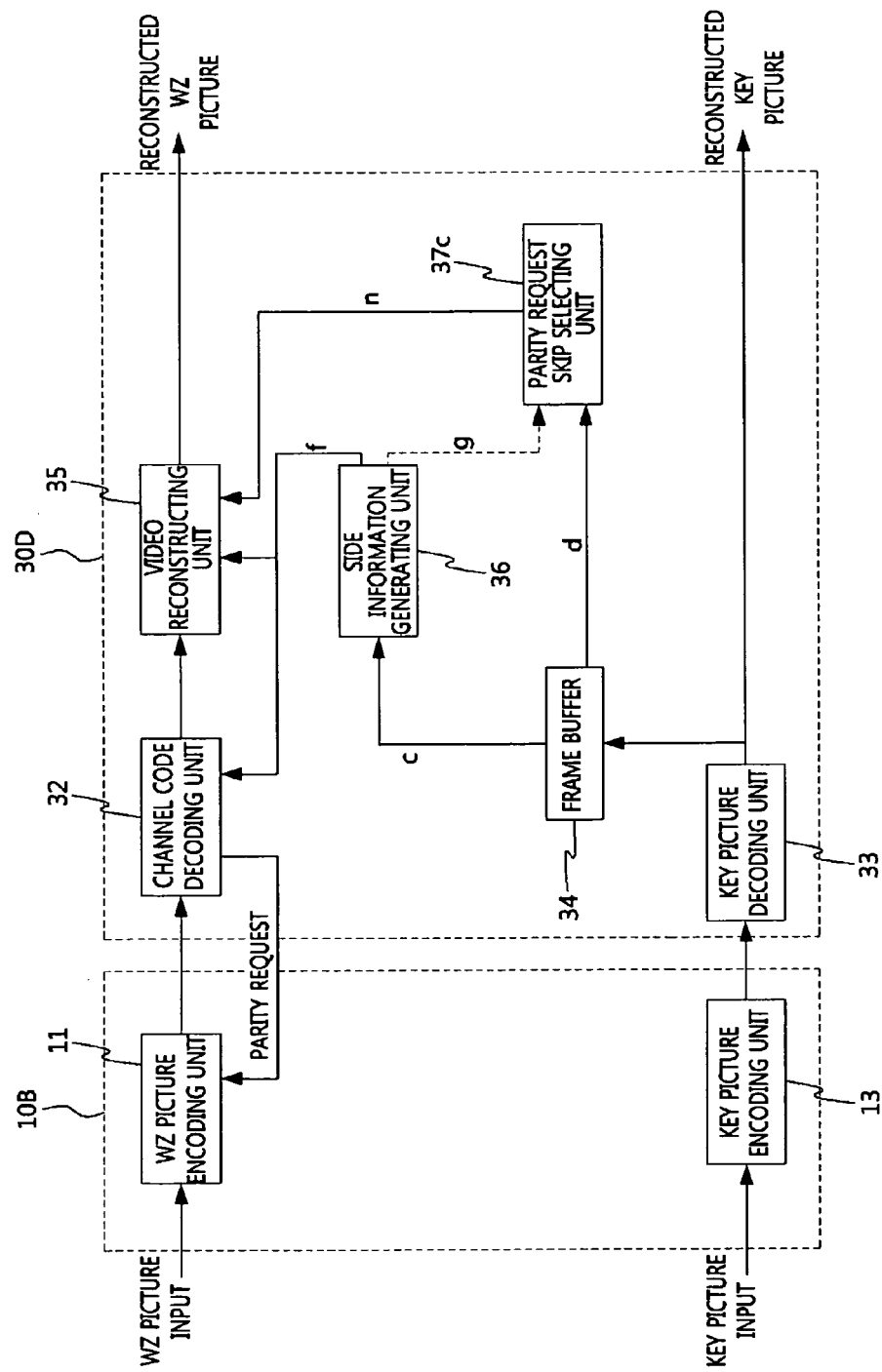
FIG. 21 is a block diagram illustrating a Wyner-Ziv encoding and decoding system according to a fourth example embodiment of the present invention.

FIG. 21 is a block diagram illustrating a Wyner-Ziv encoding and decoding system according to a fourth example embodiment of the present invention.

Referring to FIG. 21, a Wyner-Ziv encoder 10B includes a key picture encoding unit 13 and a WZ picture encoding unit 11. A decoder 30D includes a key picture decoding unit 33, a channel code decoding unit 32, a video reconstructing unit 35, a side information generating unit 36, and a parity request skip selecting unit 37c.

The key picture decoding unit 33 reconstructs the key picture using information received from the key picture encoding unit 13. The parity request skip selecting unit 37c determines an image quality of the generated side information. When the parity request skip selecting unit 37c determines that the generated side information has a good image quality (for example, an image quality may be determined as being good when temporal reliability or spatial reliability is equal to or more than a predetermined threshold value as in Equations 5 to 8), the decoder 30D skips a request of a parity for correcting the noise of side information and uses (n) side information having the good image quality as a reconstructed image.

The method of selectively skipping a request of a parity for error correction with respect to the side information having the good image quality through the parity request skip selecting unit 37c reduces an amount of parity bits transmitted from the encoder and thus is advantages from a point of view of a bit rate. Since the side information having the good image quality is used (n) as the reconstructed image, the quality of the image reconstructed by the decoder does not greatly deteriorate.

A method of selecting side information or a coding unit within side information which has a good image quality through the parity request skip selecting unit 37c is opposite to the method of selecting hash information (Equations 1 to 4).

$$\text{If } N\left\{\text{mv\_RE} = \frac{\text{mv\_KEY}}{2}\right\} > \sigma'_1, \text{ skip parity.} \quad \text{Equation 5}$$

$$\text{If } \left|(\text{mv\_RE}) - \left(\frac{\text{mv\_KEY}}{2}\right)\right| < \sigma'_2, \text{ skip parity.} \quad \text{Equation 6}$$

$$SAD(x, y) = \sum_{i=0}^{3} \sum_{j=0}^{3} |A(x+i, y+j) - B(x+i, y+j)| \quad \text{Equation 7}$$

$$SAD(x, y) < \sigma'_3, \text{ skip parity.}$$

$$NHD[\hat{X}(i, j)] = \quad \text{Equation 8}$$
$$\{\hat{X}(i-1, j), \hat{X}(i+1, j), \hat{X}(i, j-1), \hat{X}(i, j+1)\}$$
$$\Delta_{max} = \hat{X}(i, j) - \max NHD[\hat{X}(i, j)],$$
$$\Delta_{min} = \min NHD[\hat{X}(i, j)] - \hat{X}(i, j)$$
$$\Delta_{spatial} = \frac{\Delta_{max} + |\Delta_{max}| + \Delta_{min} + |\Delta_{min}|}{2}$$
$$C_{spatial} = \frac{1}{\Delta_{spatial}}$$
$$C_{spatial} \geq \sigma'_4 \to \text{Confidence}[\hat{X}(i, j)] = 1 \to \text{skip parity}$$
$$C_{spatial} < \sigma'_4 \to \text{Confidence}[\hat{X}(i, j)] = 0 \to \text{no skip parity.}$$

Equations 5 to 8 is a method of estimating an amount of the noise included in side information to be generated and determining whether or not an estimated noise amount is small. Side information which is determined as the estimated noise amount is small by Equations 5 to 8, that is, side information or a coding unit within side information which has a good image quality, is reconstructed as a final WZ picture without being subject to selective error correction. In this case, an overall image quality of the reconstructed image does not deteriorate. With respect to side information with the good image quality, the parity request for error correction is skipped, whereby an amount of parity bits transmitted from the encoder to the decoder is reduced, and an overall system performance of a transmission bit rate is improved.

Figure 22:
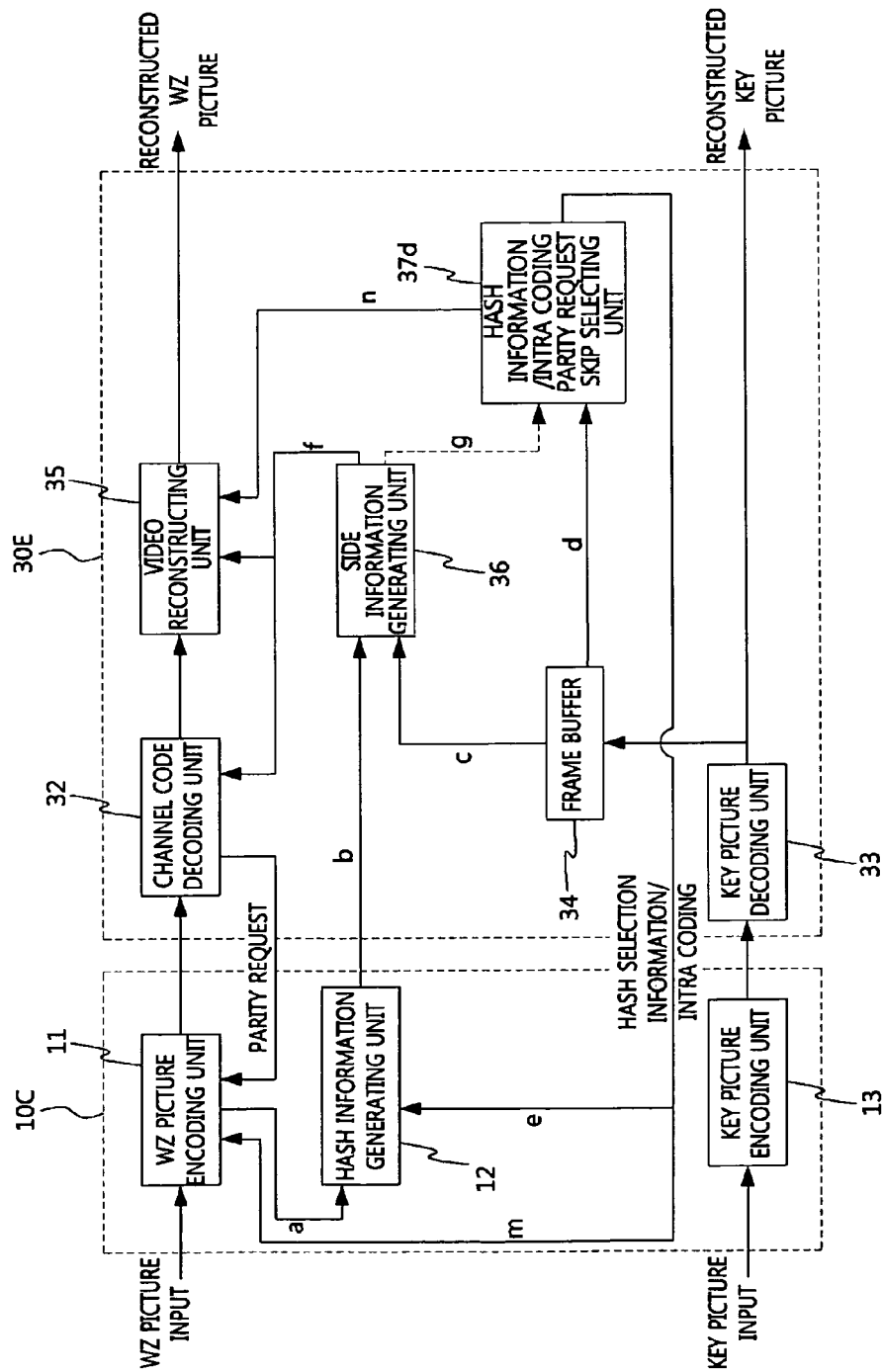
FIG. 22 is a block diagram illustrating a Wyner-Ziv encoding and decoding system according to a fifth example embodiment of the present invention.

FIG. 22 is a block diagram illustrating a Wyner-Ziv encoding and decoding system according to a fifth example embodiment of the present invention.

The Wyner-Ziv encoding and decoding system of FIG. 22 includes a Wyner-Ziv encoder 10C and a distributed video decoder 30E which has a function of generating side information by selectively using hash information, a function of selectively performing intra coding, and a function of selectively skipping a parity request.

Referring to FIG. 22, the Wyner-Ziv encoder 10C includes a key picture encoding unit 13, a WZ picture encoding unit 11, and a hash information generating unit 12. The decoder 30E includes a key picture decoding unit 33, a channel code decoding unit 32, a frame buffer 34, a video reconstructing unit 35, a side information generating unit 36, and a hash information/intra coding/parity request skip selecting unit 37d.

The key picture decoding unit 33 reconstructs the key picture by using information received from the key picture encoding unit 13. The hash information/intra coding/parity request skip selecting unit 37d estimates an amount of the noise included in side information to be generated and selects side information (a WZ picture unit) or a coding unit (a WZ macroblock unit or a block unit of a predetermined size) within side information which is estimated as having a lot of noises. Instead of distributed video coding, a coding technique (m) such as intra picture coding, inter picture coding or skipping techniques described in H.264 is applied to the side information or the coding unit within the side information which is estimated as having a lot of noises. Alternatively, distributed video coding in which the hash selection information e is fed back, may be applied to the side information or the coding unit within the side information which is estimated as having a lot of noises, so that an image quality of side information may be improved using hash information.

The hash information/intra coding/parity request skip selecting unit 37d requests the decoder to skip the parity request for error correction of side information with respect to side information or a coding unit within side information which is estimated as having a small noise, whereby the transmission bit rate is improved. Even though selected side information with the good image quality is used as the finally reconstructed WZ picture, the image quality does not greatly deteriorate.

The distributed video coding technique is applied to side information or a coding unit within side information which is not selected by the method of improving the image quality of side information using intra coding (m) or the hash selection information (e) or the method of skipping (n) the parity request.

A method of selecting side information or a coding unit within side information to which intra coding is to be applied or in which hash information is to be used through the hash information/intra coding/parity request skip selecting unit 37d is the same as the method of selecting the hash information (Equations 1 to 4). As in Equations 1 to 4, an amount of the noise included in side information to be generated is estimated, and it is determined whether or not an estimated noise amount is large. When it is determined by Equations 1 to 4 that side information is estimated as having a lot of noises, the method of selectively performing intra coding and the method of improving the image quality of side information by selectively using the hash information are applied, thereby improving an overall system rate-distortion performance.

A method of skipping the parity request so that error correction is not to be performed and selecting side information or a coding unit within side information which is to be used as the finally reconstructed WZ picture through the hash information/intra coding/parity request skip selecting unit 37d is opposite to the method of selecting the hash information (Equations 1 to 4). As in Equations 5 to 8, an amount of the noise included in side information to be generated is estimated, and it is determined whether or not an estimated noise amount is small. When it is determined by Equations 5 to 8 that side information is estimated as having a small noise, the parity request is selectively skipped, thereby improving an overall system rate-distortion performance.

Figure 23:
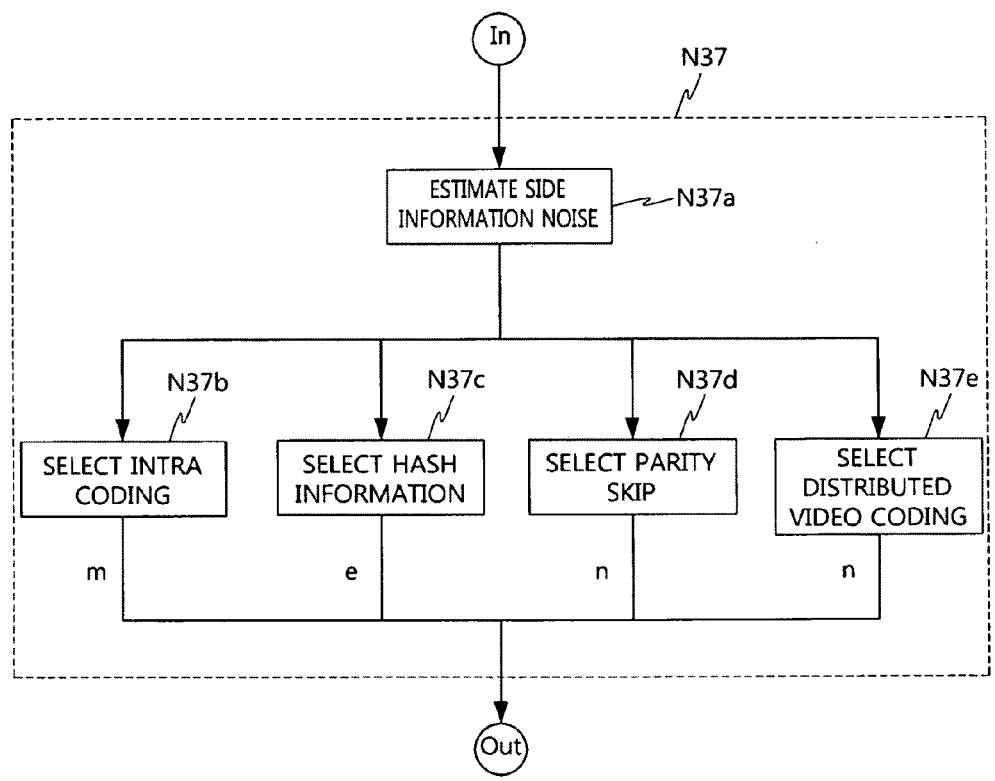
FIG. 23 is a flowchart illustrating a function of a hash information/intra coding/parity request selecting unit.

FIG. 23 is a flowchart N37 illustrating a function of the hash information/intra coding/parity request selecting unit 37d of the Wyner-Ziv encoding and decoding system of FIG. 22. As described above, the Wyner-Ziv encoding and decoding system of FIG. 22 includes the Wyner-Ziv encoder 10C and the distributed video decoder 30E which has the function of generating side information by selectively using hash information, the function of selectively performing intra coding, and the function of selectively skipping a parity request.

Referring to FIG. 23, in step N37a, an amount of the noise included in the generated side information g or an amount of the noise included in side information to be generated from the reconstructed key picture d is estimated.

When the estimated noise amount of the side information is large, an intra coding process is selected (N37b) or a process of improving the side information using hash information is selected (N37c). The two processes are coding techniques which can be selected when the estimated noise amount of the side information is large. The process (step N37b) may include intra picture coding, inter picture coding or skipping techniques described in H.264.

When the estimated noise amount of the side information is small, the generated side information with the good image quality is transmitted to the video reconstructing unit (35 in FIG. 22). A process of skipping the parity request for error correction of the side to information and reconstructing the side information with the good image quality as the WZ picture may be selected (N37d). The process (step N37d) reduces an amount of the parity bits transmitted from the encoder and thus improves an overall system bit rate performance. In this case, since the side information has the good image quality, the image quality of the reconstructed image does not greatly deteriorate.

Except when the estimated noise amount of the side information is large or when the estimated noise amount of the side information is small, the generated side information is transmitted to the video reconstructing unit (35 of FIG. 22), and a distributed video coding process is selected (N37e). The parity is received from the encoder, and error correction of side information is performed to thereby reconstruct the final WZ picture.

As described above, according to the present invention, motion estimation reliability is measured at the time of side information generation, and it is determined whether or not hash information is necessary at the time of side information generation based on a predetermined determination criterion. With respect to side information determined as needing the hash information, the hash information is effectively selected by using a predetermined determination criterion. Side information with a reduced noise can be generated using the selected hash information. The side information is generated by selectively using the hash information, thereby increasing the compression rate and remarkably improving a performance of the decoder.

While the example embodiments of the present invention and their advantages have been described in detail, it should be understood that various changes, substitutions and alterations may be made herein without departing from the scope of the invention.

What is claimed is:

1. A distributed video decoder, comprising:
a key picture decoding unit which reconstructs a key picture received from an encoder;
a hash information selecting unit which determines necessary hash information using the reconstructed key picture and/or generated previous side information; and
a side information generating unit which generates side information using the reconstructed key picture and/or hash information selected based on information determined by the hash information selecting unit;
wherein the hash information selecting unit computes estimation reliability of current side information to be reconstructed by using the reconstructed key picture and/or the generated previous side information and transmits hash selection information for selecting necessary hash information by the hash selection criterion information;
wherein the hash information selecting unit comprises:
a motion estimation reliability measuring unit which measures reliability of a motion vector within the current side information to be reconstructed based on the reconstructed key picture and/or the generated previous side information; and
a hash information determining unit which determines hash information necessary for generating side information with reduced noise based on the motion estimation reliability measured by the motion estimation reliability and the hash selection criterion information;
wherein the hash information selecting unit includes:
a hash information position determining unit which selects a portion which needs hash information by using the motion estimation reliability and a hash selection criterion information,
a hash information type determining unit which determines a hash information type used in the selected portion, and
a hash information amount determining unit which determines a hash information amount of the determined type corresponding to the selected portion.

2. The distributed video decoder of claim 1, further comprising:
a channel code decoding unit which estimates a quantized value by using a parity bit received from the encoder and the generated side information; and
a video reconstructing unit which reconstructs a current picture as a decoding target by using the quantized value estimated by the channel code decoding unit and the generated side information.

3. The distributed video decoder of claim 2, wherein the side information generating unit comprises:
a hash information determining unit which determines whether or not hash information is received from the encoder;
a first side generating unit which generates side information using the reconstructed key picture and the hash information;
a second side generating unit which generates side information using the reconstructed key picture; and
a final side information generating unit which stores final side information to be transmitted to the channel code decoding unit and the video decoding unit.

4. The distributed video decoder of claim 3, wherein the hash information determining unit determines whether or not hash information is received from the hash information generating unit, transmits the reconstructed key picture and the hash information to the first side information generating unit when the hash information is received, and transmits the reconstructed key picture to the second side information generating unit when the hash information is not received.

5. The distributed video decoder of claim 2, further comprising:
a transform unit which moves the reconstructed key pictures to a transform area when a decoding area of pictures to be reconstructed is a transform area other than a pixel area; and
an inverse transform unit which moves reconstructed pictures output from the video reconstructing unit to the pixel area.

6. The distributed video decoder of claim 1, wherein the motion estimation reliability measuring unit comprises:

at least one of a temporal similarity measuring unit and a spatial similarity measuring unit, the temporal similarity measuring unit measuring temporal similarity between the reconstructed key pictures or between the reconstructed key picture and the generated previous side information, the spatial similarity measuring unit measuring spatial similarity between a certain pixel within the reconstructed key picture and/or the generated side information and a neighboring pixel; and a final reliability determining unit which finally determines motion estimation reliability based on the temporal similarity and/or the spatial similarity.

7. The distributed video decoder of claim 6, wherein the temporal similarity measuring unit measures the temporal similarity by using a sum of pixel value differences between pixels within corresponding coding units of the reconstructed key pictures.

8. The distributed video decoder of claim 6, wherein the temporal similarity measuring unit measures the temporal similarity by comparing a motion vector between the reconstructed key pictures and a motion vector between the reconstructed key picture and the generated previous side information.

9. The distributed video decoder of claim 6, wherein the spatial similarity measuring unit measures the spatial similarity by using a pixel value difference between the certain pixel and the neighboring pixel.

10. The distributed video decoder of claim 1, wherein the hash information position determining unit selects a picture which needs hash information at the time of side information generation or a position of a portion which needs hash information corresponding to a coding unit within a picture, the coding unit including a macroblock or a block of a size, the determined hash information type includes at least one of a pixel value, a sum of pixel values within a block, an average of pixel values within a block, a standard deviation of pixel values within a block, boundary information, DC information, and AC information, and the hash information amount determining unit outputs an overall hash information according to the selected position and the determined type or outputs hash information of a smaller amount.

11. A distributed video decoding method, comprising:
reconstructing a key picture received from an encoder;
determining necessary hash information using the reconstructed key picture and/or generated previous side information; and
generating side information using the reconstructed key picture and/or hash information selected based on information determined by the hash information selecting unit; and
estimating a quantized value by using a parity bit received from the encoder and the generated side information; and
reconstructing a current picture as a decoding target by using the estimated quantized value and the generated side information;
wherein the determining necessary hash information comprises:
computing estimation reliability of current side information to be reconstructed by using the reconstructed key picture and/or the generated previous side information; and
transmitting hash selection information for selecting necessary hash information by the estimation reliability and hash selection criterion information;
wherein the determining necessary hash information includes:
determining a position of a portion which needs hash information corresponding to side information or a coding unit within side information which needs hash information and determining a hash information position by using the motion estimation reliability and a hash selection criterion information, the coding unit including a macroblock or a block of a size;
determining a hash information type in the side information or the coding unit within the side information which needs the hash information; and
determining a hash information amount after the hash information position and type are determined.

12. The distributed video method of claim 11, wherein the computing estimation reliability comprises:
at least one of measuring temporal similarity between the reconstructed key pictures or between the reconstructed key picture and the generated previous side information and measuring spatial similarity between a certain pixel within the reconstructed key picture and/or the generated side information and a neighboring pixel; and
finally determining motion estimation reliability based on at least one of the temporal similarity and the spatial similarity.

13. The distributed video method of claim 12, wherein the temporal similarity is measured by using a sum of pixel value differences between pixels within corresponding coding units of the reconstructed key pictures, a sum of pixel value differences between corresponding pixels within corresponding coding units of the reconstructed key picture and the generated previous side information, or a difference between a motion vector between the reconstructed key pictures and a motion vector between the reconstructed key picture and the generated previous side information.

14. The distributed video method of claim 12, wherein the spatial similarity is measured by using a pixel value difference between a certain pixel and a neighboring pixel within the reconstructed key picture and/or the generated previous side information.

15. The distributed video method of claim 11, wherein the hash information type includes at least one of a pixel value, a sum of pixel values within a block, an average of pixel values within a block, a standard deviation of pixel values within a block, boundary information, DC information, and AC information.

16. The distributed video method of claim 11, wherein the generating side information comprises:
determining whether or not the hash information is received;
generating first side information using the reconstructed key picture and the hash information when it is determined that the hash information is received;
generating second side information using the reconstructed key picture when it is determined that the hash information is not received; and
determining final side information based on the first side information and the second side information.

* * * * *